(12) United States Patent
Saito et al.

(10) Patent No.: US 9,455,605 B2
(45) Date of Patent: Sep. 27, 2016

(54) ROTATING ELECTRICAL MACHINE AND VEHICLE EQUIPPED WITH ROTATING ELECTRICAL MACHINE

(75) Inventors: Yasuyuki Saito, Hitachinaka (JP); Noriaki Hino, Mito (JP); Tomoaki Kaimori, Hitachinaka (JP); Kenichi Nakayama, Hitachinaka (JP); Yoshimi Mori, Mito (JP); Keiji Oda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 665 days.

(21) Appl. No.: 13/810,838

(22) PCT Filed: Jul. 20, 2011

(86) PCT No.: PCT/JP2011/066444
§ 371 (c)(1),
(2), (4) Date: Jan. 17, 2013

(87) PCT Pub. No.: WO2012/011493
PCT Pub. Date: Jan. 26, 2012

(65) Prior Publication Data
US 2013/0113330 A1    May 9, 2013

(30) Foreign Application Priority Data
Jul. 20, 2010  (JP) .................................. 2010-163100

(51) Int. Cl.
*H02K 3/28*  (2006.01)
*H02K 21/14*  (2006.01)

(52) U.S. Cl.
CPC ................ *H02K 3/28* (2013.01); *H02K 21/14* (2013.01); *B60L 2220/14* (2013.01); *B60L 2220/54* (2013.01); *Y02T 10/641* (2013.01)

(58) Field of Classification Search
CPC ............................... H02K 3/28; H02K 21/14
See application file for complete search history.

(56) References Cited

U.S. PATENT DOCUMENTS

| 6,894,417 B2 | 5/2005 | Cai et al. |
| 2004/0061400 A1 | 4/2004 | Fukushima et al. |
| 2007/0018525 A1* | 1/2007 | Cai .......................... H02K 3/28 310/184 |

FOREIGN PATENT DOCUMENTS

| JP | 57-52336 A | 3/1982 |
| JP | 5-227688 A | 9/1993 |

(Continued)

OTHER PUBLICATIONS

Korean Office Action dated Mar. 6, 2014 with English translation (Twelve (12) pages).

(Continued)

*Primary Examiner* — Dang Le
(74) *Attorney, Agent, or Firm* — Crowell & Moring LLP

(57) ABSTRACT

A rotating electrical machine includes: a stator core; a stator winding; and a rotor. Cross conductors connect slot conductors to run astride slots with the slot pitch N+1 at coil ends on one side and run astride slots with the slot pitch N−1 at coil ends on another side, with N representing a number of slots per pole; the stator winding includes slot conductor groups each having a plurality of slot conductors; the plurality of slot conductors in each slot conductor group are inserted at a predetermined number Ns of successive slots so that the slot conductors in the slot conductor group take successive slot positions and successive layer positions; and the number Ns is set so that Ns=NSPP+NL when NSPP represents a number of slots per phase per pole and a number of layers is expressed as 2×NL.

7 Claims, 23 Drawing Sheets

(56) References Cited

FOREIGN PATENT DOCUMENTS

Figure 1:
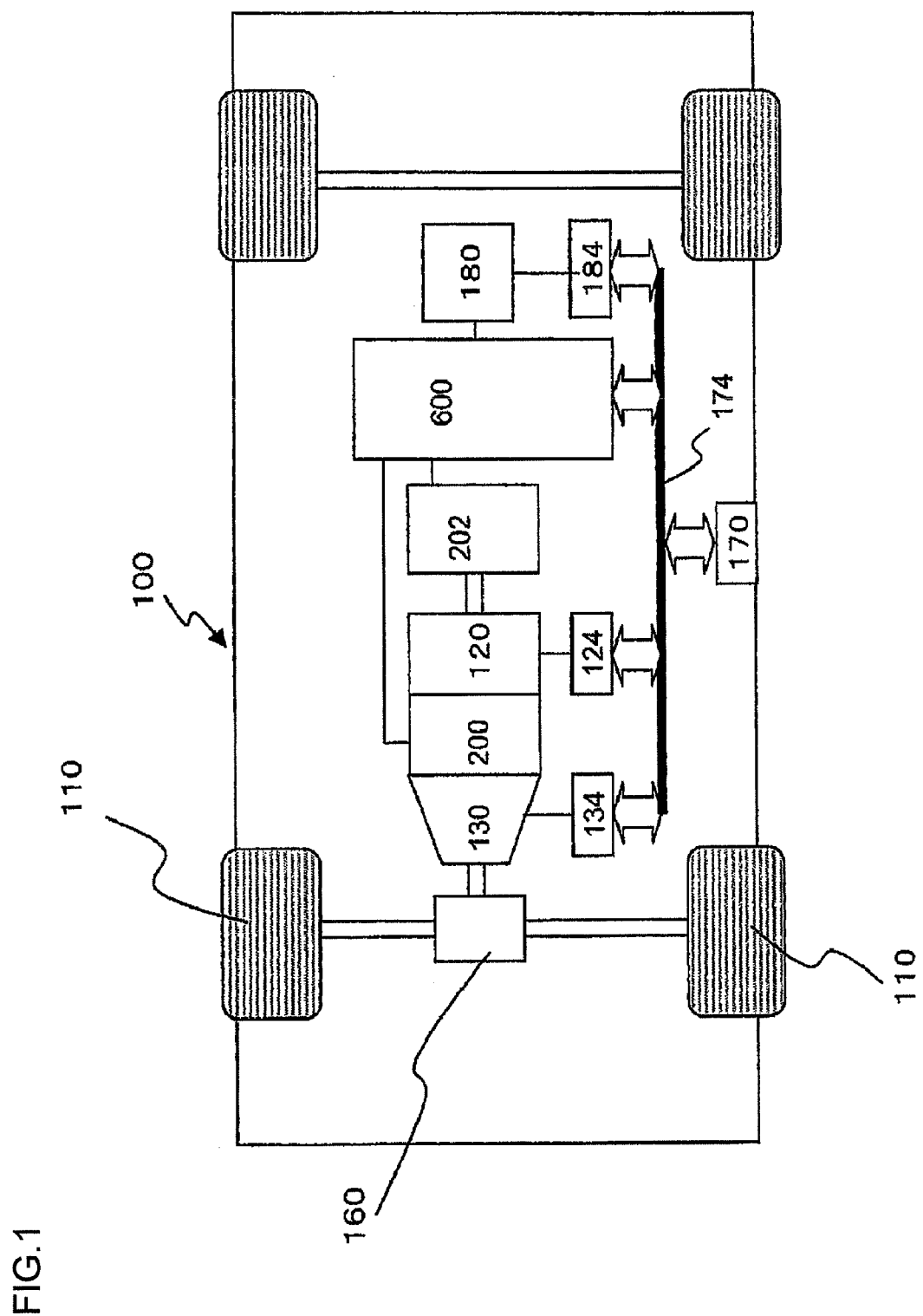

| | | |
|---|---|---|
| JP | 2004-166316 A | 6/2004 |
| JP | 2004-364464 A | 12/2004 |
| JP | 2008-141803 A | 6/2008 |
| JP | 2009-131058 A | 6/2009 |
| JP | 2014-221003 | 11/2014 |

OTHER PUBLICATIONS

Corresponding International Search Report with English Translation dated Oct. 11, 2011 (three (3) pages).

Japanese Office Action dated Apr. 21, 2015, with English translation (Six (6) pages).

* cited by examiner

FIG.11
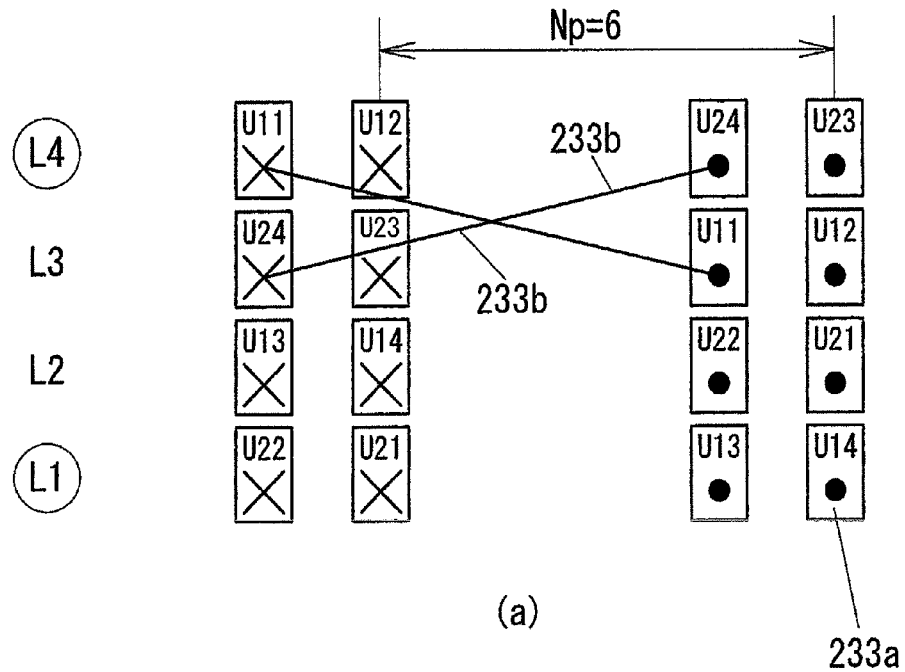
(a)
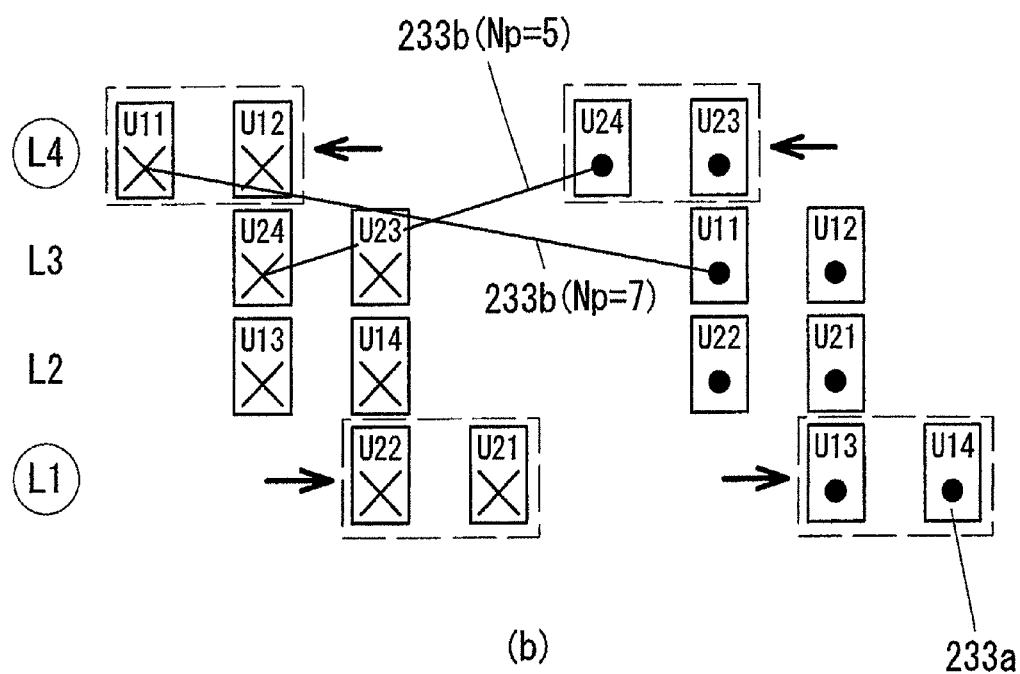
(b)

FIG.18
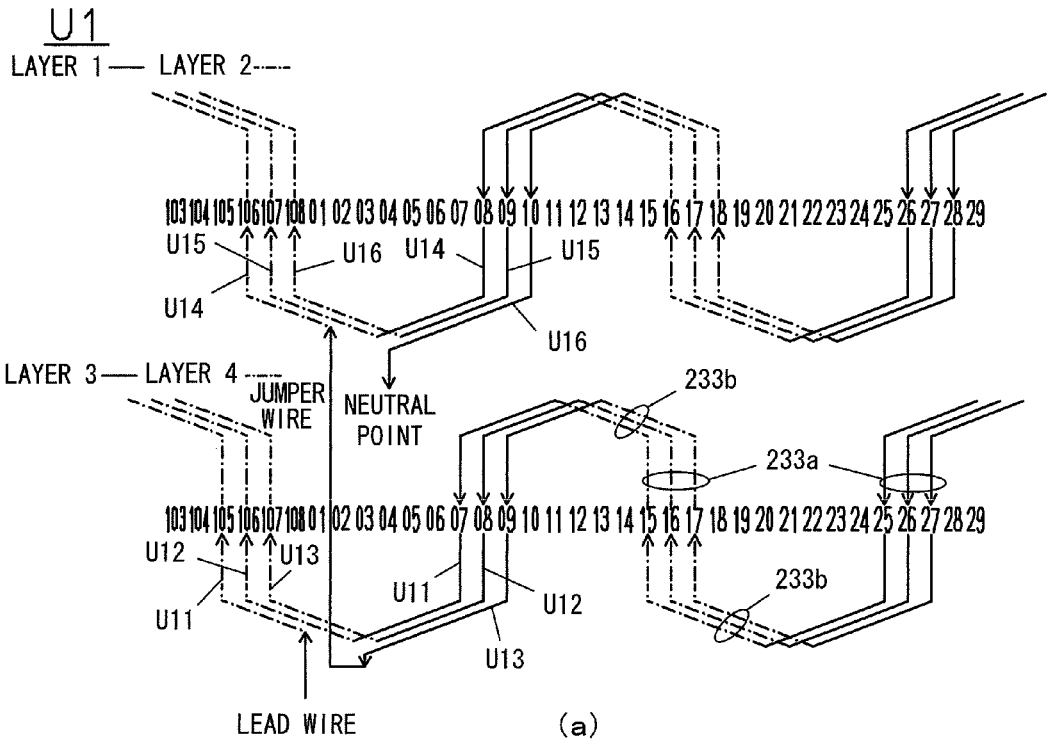
(a)
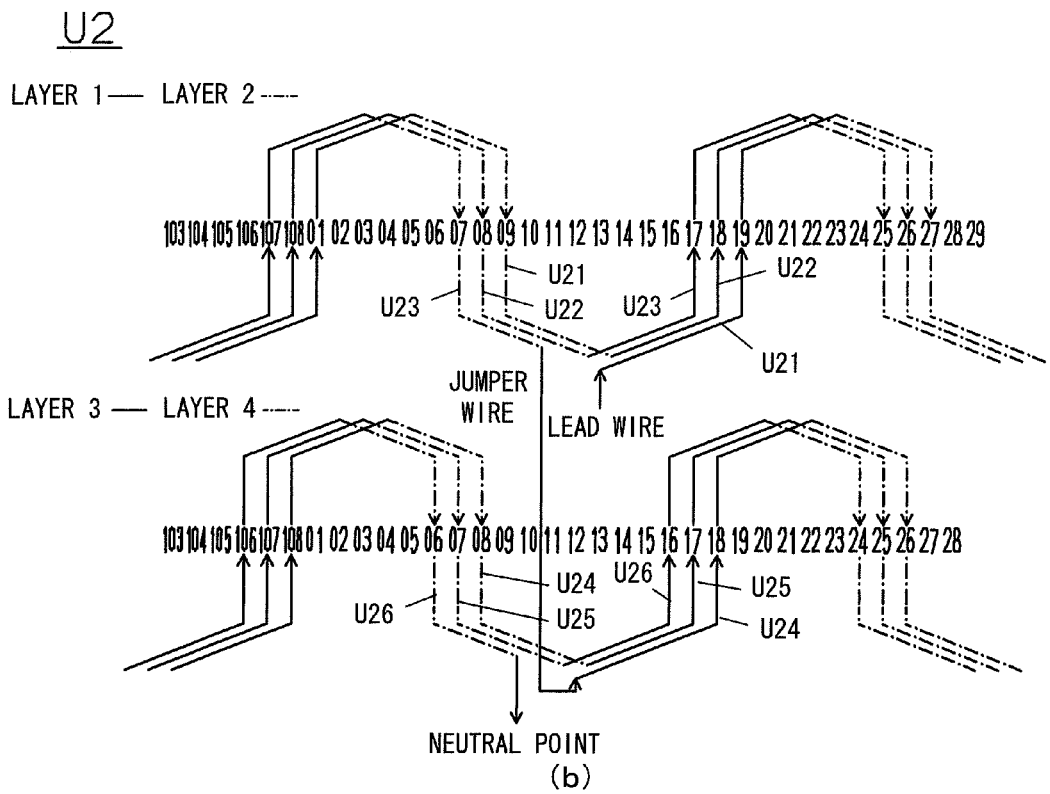
(b)

ROTATING ELECTRICAL MACHINE AND VEHICLE EQUIPPED WITH ROTATING ELECTRICAL MACHINE

TECHNICAL FIELD

The present invention relates to a rotating electrical machine and a vehicle equipped with the rotating electrical machine.

BACKGROUND ART

The winding technologies adopted in conjunction with rotating electrical machines used to drive vehicles include that disclosed in patent literature 1.

CITATION LIST

Patent Literature
  Patent literature 1: U.S. Pat. No. 6,894,417

SUMMARY OF THE INVENTION

Technical Problem

A rotating electrical machine mounted in an electric vehicle or the like is required to operate without generating any significant noise. Accordingly, an object of the present invention is to achieve noise reduction in a rotating electrical machine.

Solution to Problem

According to the 1st aspect of the present invention, a rotating electrical machine, comprises: a stator core having a plurality of slots formed therein; a stator winding assuming a plurality of phases, which includes a plurality of round windings wound with a wave winding pattern, each having slot conductors each inserted at one of the slots at the stator core to form one of a plurality of layers and cross conductors each connecting same-side ends of slot conductors inserted at different slots so as to form a coil end; and a rotor rotatably supported with an air gap so as to be allowed to rotate relative to the stator core, wherein: the cross conductors connect the slot conductors so as to run astride slots with the slot pitch Np set to N+1 at coil ends on one side and run astride slots with the slot pitch Np set to N−1 at coil ends on another side, with N representing a number of slots per pole; the stator winding includes a plurality of slot conductor groups each having a plurality of slot conductors corresponding to a single phase; the plurality of slot conductors in each slot conductor group are inserted at a predetermined number Ns of successive slots forming a continuous range along a circumference of the stator core so that the slot conductors in the slot conductor group take successive slot positions and successive layer positions; and the predetermined number Ns is set so that Ns=NSPP+NL when NSPP represents a number of slots per phase per pole and a number of layers is expressed as 2×NL.

According to the 2nd aspect of the present invention, in the rotating electrical machine according to the 1st aspect, it is preferred that: the slot conductor groups each include NL slot conductor subgroups each formed by disposing slot conductors in a (2m−1)th layer and slot conductors in a 2mth layer with an offset relative to each other along the circumference of the stator core by a 1-slot pitch; the NL slot conductor subgroups are disposed with a 1-slot pitch offset relative to one another along the circumference of the stator core; and m=1, 2, . . . , NL.

According to the 3rd aspect of the present invention, a rotating electrical machine, comprises: a stator core having a plurality of slots formed therein; a stator winding assuming a plurality of phases, which include a plurality of round windings wound with a wave winding pattern, each having slot conductors each inserted at one of the slots at the stator core to form one of a plurality of layers and cross conductors each connecting same-side ends of slot conductors inserted at different slots so as to form a coil end; and a rotor rotatably supported with an air gap so as to be allowed to rotate relative to the stator core, wherein: the cross conductors connect the slot conductors so as to run astride slots with the slot pitch Np set to N+1 at coil ends on one side and run astride slots with the slot pitch Np set to N−1 at coil ends on another side, with N representing a number of slots per pole; the stator winding includes a plurality of slot conductor groups each having a plurality of slot conductors corresponding to a single phase, formed by disposing slot conductors to form a specific layer over a predetermined number NSPP of successive slots; in each slot conductor group, slot conductors in a 2mth layer, counting from an inner circumferential side of the slots, are disposed with an offset relative to slot conductors in a first layer by an m-slot pitch in one direction running along a circumference of the stator core and slot conductors in a(2m−1)th layer, excluding the first layer, are disposed with an offset relative to the slot conductors in the first layer by an (m−1) slot pitch in the one direction; and NSPP represents a number of slots per phase per pole, a number of layers is expressed as 2×NL and m=1, 2, . . . , NL.

According to the 4th aspect of the present invention, in the rotating electrical machine according to any one of the 1 through 3 aspects, it is preferred that the round windings are each formed by connecting a plurality of segment conductors.

According to the 5th aspect of the present invention, in the rotating electrical machine according to any one of the 1 through 4 aspects, it is preferred that the slot conductors are constituted with flat wire.

According to the 6th aspect of the present invention, in the rotating electrical machine according to any one of the 1 through 5 aspects, it is preferred that the stator winding includes a plurality of Y connections and there is no phase difference manifesting between voltages induced at same-phase windings in the plurality of Y connections.

According to the 7th aspect of the present invention, a vehicle comprises: a rotating electrical machine according to any one of the 1 through 6 aspects; a battery that provides DC power; and a conversion device that converts the DC power originating from the battery to AC power and provides the AC power to the rotating electrical machine, wherein: torque generated in the rotating electrical machine is used as a drive force to drive the vehicle.

Advantageous Effect of the Invention

The present invention achieves noise reduction in a rotating electrical machine and a vehicle equipped with the rotating electrical machine.

BRIEF DESCRIPTION OF THE DRAWINGS (FIG. 1) A schematic diagram showing the structure of a hybrid electric vehicle (FIG. 2) A circuit diagram pertaining to the power conversion device 600

(FIG. 3) A sectional view of the rotating electrical machine 200

(FIG. 4) A sectional view of the stator 230 and the rotor 250

(FIG. 5) A perspective of the stator 230

(FIG. 6) A connection diagram pertaining to the stator winding 238

(FIG. 7) A detailed connection diagram pertaining to the U-phase winding (FIG. 8) A part of the U1-phase winding group in an enlargement (FIG. 9) A part of the U2-phase winding group in an enlargement (FIG. 10) A diagram indicating the positional arrangement with which the slot conductors 233a are disposed (FIG. 11) Diagrams indicating the positional arrangement among the slot conductors 233a (FIG. 12) A diagram indicating induced voltage waveforms (FIG. 13) A diagram providing results obtained by analyzing the higher harmonic component in the induced voltage waveforms (FIG. 14) A diagram indicating waveforms of torque induced by supplying an AC current (FIG. 15) A diagram providing results obtained by analyzing the higher harmonic component in torque waveforms (FIG. 16) A detailed connection diagram pertaining to the U-phase winding achieved in a second embodiment (FIG. 17) A diagram indicating the positional arrangement with which slot conductors 233a are disposed in the second embodiment (FIG. 18) A detailed connection diagram pertaining to a part of the U-phase winding achieved in a third embodiment (FIG. 19) A diagram indicating the positional arrangement with which slot conductors 233a are disposed in the third embodiment (FIG. 20) Another example of a positional arrangement that may be adopted for slot conductors when the number of slots per phase per pole (NSPP) is 2 and the number of layers (2×NL) is 4

(FIG. 21) Examples of slot conductor groups that may be configured when the number of slots per phase per pole (NSPP) is 2 and the number of layers (2×NL) is 4

(FIG. 22) Examples of slot conductor groups that may be configured when the number of slots per phase per pole (NSPP) is 2 and the number of layers (2×NL) is 6

(FIG. 23) Examples of slot conductor groups that may be configured when the number of slots per phase per pole (NSPP) is 3 and the number of layers (2×NL) is 4

DESCRIPTION OF EMBODIMENTS

The following is a description of embodiments of the present invention, given in reference to the drawings.

First Embodiment

The rotating-electrical machine according to the present invention achieves noise reduction by reducing the extent of torque ripple. For this reason, it is ideal in applications in which it is used as a traveling motor for an electric vehicle. While the rotating-electrical machine according to the present invention may be adopted in a pure electric vehicle engaged in traveling operation exclusively on a rotating-electrical machine or in a hybrid type electric vehicle driven both by an engine and a rotating-electrical machine, the following description is given by assuming that the present invention is adopted in a hybrid type electric vehicle.

FIG. 1 is a schematic illustration showing the structure of a hybrid type electric vehicle having installed therein rotating-electrical machines achieved in an embodiment. An engine 120, a first rotating-electrical machine 200, a second rotating-electrical machine 202 and a battery 180 are mounted at a vehicle 100. The battery 180 provides DC power to the rotating-electrical machines 200 and 202 via a power conversion device 600 when drive forces imparted by the rotating-electrical machines 200 and 202 are required, whereas it receives DC power from the rotating-electrical machines 200 and 202 during a regenerative traveling operation. The battery 180 and the rotating-electrical machines 200 and 202 exchange DC power via the power conversion device 600. In addition, although not shown, a battery that provides low-voltage power (e.g., 14 V power) is installed in the vehicle so as to supply DC power to the control circuits to be described below.

Rotational torque generated via the engine 120 and the rotating-electrical machines 200 and 202 is transmitted to front wheels 110 via a transmission 130 and a differential gear unit 160. The transmission 130 is controlled by a transmission control device 134, whereas the engine 120 is controlled by an engine control device 124. The battery 180 is controlled by a battery control device 184. The transmission control device 134, the engine control device 124, the battery control device 184, the power conversion device 600 and an integrated control device 170 are connected with one another via a communication line 174.

The integrated control device 170, which is a higher order control device relative to the transmission control device 134, the engine control device 124, the power conversion device 600 and the battery control device 184, receives, via the communication line 174, information originating from the transmission control device 134, the engine control device 124, the power conversion device 600 and the battery control device 184, indicating the statuses at the individual lower-order control devices. Based upon the information thus received, the integrated control device 170 generates, through arithmetic operation, a control command for each corresponding control device. The control command generated through the arithmetic operation is then transmitted to the particular control device via the communication line 174.

The high-voltage battery 180, constituted with secondary battery cells such as lithium ion battery cells or nickel hydride battery cells, is capable of outputting high-voltage DC power in a range of 250 to 600 v or higher. The battery control device 184 outputs, via the communication line 174, information indicating the state of charge/discharge in the battery 180 and the states of the individual battery cell units constituting the battery 180 to the integrated control device 170.

Upon judging, based upon the information provided by the battery control device 184, that the battery 180 needs to be charged, the integrated control device 170 issues a power generation operation instruction for the power conversion device 600. The primary functions of the integrated control device 170 further include management of torque output from the engine 120 and the rotating-electrical machines 200 and 202, arithmetic processing executed to calculate the overall torque representing the sum of the torque output from the engine 120 and the torques output from the rotating-electrical machines 200 and 202, and to calculate a torque distribution ratio thereof, and transmission of control commands generated based upon the arithmetic processing results to the transmission control device 134, the engine control device 124 and the power conversion device 600. Based upon a torque command issued by the integrated control device 170, the power conversion device 600 controls the rotating-electrical machines 200 and 202 so as to output torque or generate electric power as indicated in the command.

The power conversion device 600 includes power semiconductors that constitute inverters via which the rotating-electrical machines 200 and 202 are engaged in operation. The power conversion device 600 controls switching operation of the power semiconductors based upon a command issued by the integrated control device 170. As the power semiconductors are engaged in the switching operation as described above, the rotating-electrical machines 200 and 202 are each driven to operate as an electric motor or as a power generator.

When engaging the rotating-electrical machines 200 and 202 in operation as electric motors, DC power provided from the high-voltage battery 180 is supplied to DC terminals of the inverters in the power conversion device 600. The power conversion device 600 controls the switching operation of the power semiconductors so as to convert the DC power supplied to the inverters to three-phase AC power and provide the three-phase AC power to the rotating-electrical machines 200 and 202. When engaging the rotating-electrical machines 200 and 202 in operation as generators, the rotors of the rotating-electrical machines 200 and 202 are rotationally driven with a rotational torque applied thereto from the outside and thus, three-phase AC power is generated at the stator windings of the rotating-electrical machines 200 and 202. The three-phase AC power thus generated is converted to DC power in the power conversion device 600 and the high-voltage battery 180 is charged with the DC power supplied thereto.

Figure 2:
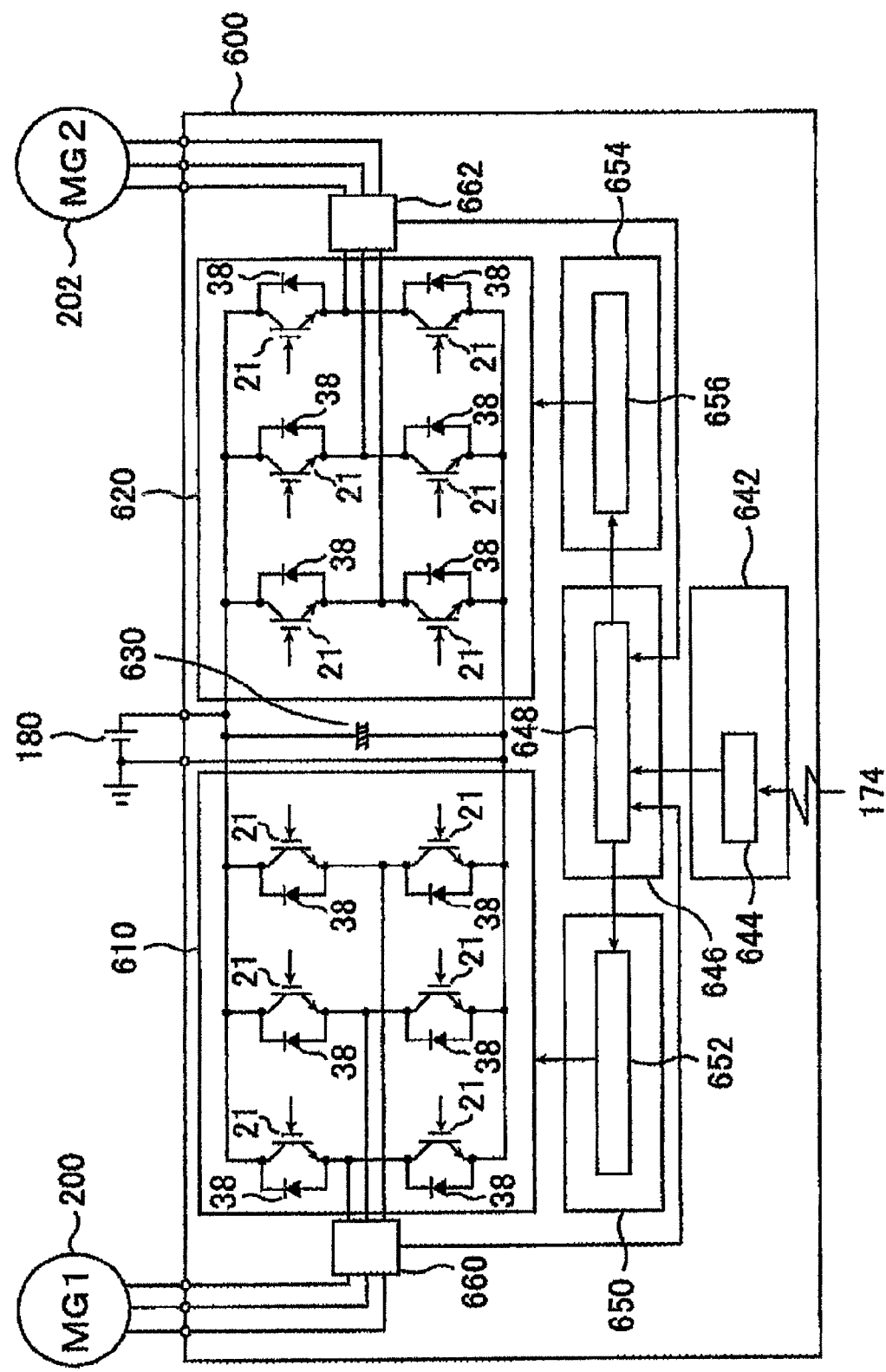

FIG. 2 is a circuit diagram pertaining to the power conversion device 600 shown in FIG. 1. The power conversion device 600 includes a first inverter device for the rotating-electrical machine 200 and a second inverter device for the rotating-electrical machine 202. The first inverter device comprises a power module 610, a first drive circuit 652 that controls switching operation of power semiconductors 21 in the power module 610 and a current sensor 660 that detects an electric current at the rotating-electrical machine 200. The drive circuit 652 is disposed at a drive circuit board 650.

The second inverter device comprises a power module 620, a second drive circuit 656 that controls switching operation of power semiconductors 21 in the power module 620 and a current sensor 662 that detects an electric current at the rotating-electrical machine 202. The drive circuit 656 is disposed at a drive circuit board 654. A control circuit 648 disposed at a control circuit board 646, a capacitor module 630 and a transmission/reception circuit 644 mounted at a connector board 642 are all shared by the first inverter device and the second inverter device.

The power modules 610 and 620 are engaged in operation with drive signals output from the corresponding drive circuits 652 and 656. The power modules 610 and 620 each convert the DC power provided from the battery 180 to three-phase AC power and provide the three-phase AC power resulting from the conversion to a stator winding constituting an armature winding of the corresponding rotating-electrical machine 200 or 202. In addition, the power modules 610 and 620 convert AC power induced at the stator windings of the rotating-electrical machines 200 and 202 to DC power and provide the DC power resulting from the conversion to the high-voltage battery 180.

As indicated in FIG. 2, the power modules 610 and 620 each include a three-phase bridge circuit constituted with serial circuits each corresponding to one of the three phases electrically connected in parallel between the positive pole side and the negative pole side of the battery 180. Each serial circuit includes a power semiconductor 21 constituting an upper arm and a power semiconductor 21 constituting a lower arm connected in series. Since the power module 610 and the power module 620 adopt circuit structures substantially identical to each other as shown in FIG. 2, the following description focuses on the power module 610 chosen as a representative example.

The switching power semiconductor elements used in the embodiment are IGBTs (insulated gate bipolar transistors) 21. An IGBT 21 includes three electrodes; a collector electrode, an emitter electrode and a gate electrode. A diode 38 is electrically connected between the collector electrode and the emitter electrode of the IGBT 21. The diode 38 includes two electrodes; a cathode electrode and an anode electrode, with the cathode electrode electrically connected to the collector electrode of the IGBT 21 and the anode electrode electrically connected to the emitter electrode of the IGBT 21 so as to define the direction running from the emitter electrode toward the collector electrode at the IGBT 21 as a forward direction.

It is to be noted that MOSFETs (metal oxide semiconductor field effect transistors) may be used as the switching power semiconductor elements, instead. A MOSFET includes three electrodes; a drain electrode, a source electrode and a gate electrode. The MOSFET does not require a diode 38, such as those shown in FIG. 2, since it includes a parasitic diode with which the direction running from the drain electrode toward the source electrode is defined as the forward direction, present between the source electrode and the drain electrode.

The upper and lower arms in the serial circuit corresponding to a given phase are configured by electrically connecting the emitter electrode of one IGBT 21 and the collector electrode of another IGBT 21 in series. It is to be noted that while the figure shows the upper arm and the lower arm corresponding to a given phase each constituted with a single IGBT, a large current control capacity needs to be assured in the embodiment and thus, a plurality of IGBTs are connected in parallel to constitute an upper arm or a lower arm in the actual power module. However, for purposes of simplification, the following explanation is given by assuming that each arm is constituted with a single power semiconductor.

In the embodiment described in reference to FIG. 2, each upper arm or lower arm, corresponding to one of the three phases, is actually configured with three IGBTs. With respect to each arm, the collector electrode of the IGBT 21 constituting the upper arm in a given phase is electrically connected to the positive pole side of the battery 180, whereas the source electrode of the IGBT 21 constituting the lower arm in a given phase is electrically connected to the negative pole side of the battery 180. A middle point between the arms corresponding to each phase (an area where the emitter electrode of the upper arm-side IGBT and the collector electrode of the lower arm-side IGBT are connected) is electrically connected to the armature winding (stator winding) at the corresponding phase at the corresponding rotating-electrical machine 200 or 202.

The drive circuits 652 and 656, constituting drive units via which the corresponding inverter devices 610 and 620 are controlled, generate drive signals used to drive the IGBTs 21 based upon a control signal output from the control circuit 648. The drive signals generated at the individual drive circuits 652 and 656 are respectively output to the gates of the various power semiconductor elements in the corresponding power modules 610 and 620. The drive circuits 652 and 656 are each configured as a block constituted with six integrated circuits that generate drive signals to be provided to the gates of the upper and lower arms corresponding to the various phases.

The control circuit 648, which controls the inverter devices 610 and 620, is constituted with a microcomputer that generates, through arithmetic operation, a control signal (a control value) based upon which the plurality of switching power semiconductor elements are engaged in operation (turned on/off). A torque command signal (a torque command value) provided from a higher-order control device, sensor outputs from the current sensors 660 and 662, and sensor outputs from rotation sensors mounted at the rotating-electrical machines 200 and 202 are input to the control circuit 648. Based upon these signals input thereto, the control circuit 648 calculates control values and outputs control signals to the drive circuits 652 and 656 to be used to control the switching timing.

The transmission/reception circuit 644 mounted at the connector board 642, which electrically connects the power conversion device 600 with an external control device, is engaged in information exchange with another device via the communication line 174 shown in FIG. 1. The capacitor module 630, constituting a smoothing circuit via which the extent of DC voltage fluctuation occurring as the IGBTs 21 are engaged in switching operation is reduced, is electrically connected in parallel with DC-side terminals of the first power module 610 and the second power module 620.

Figure 3:
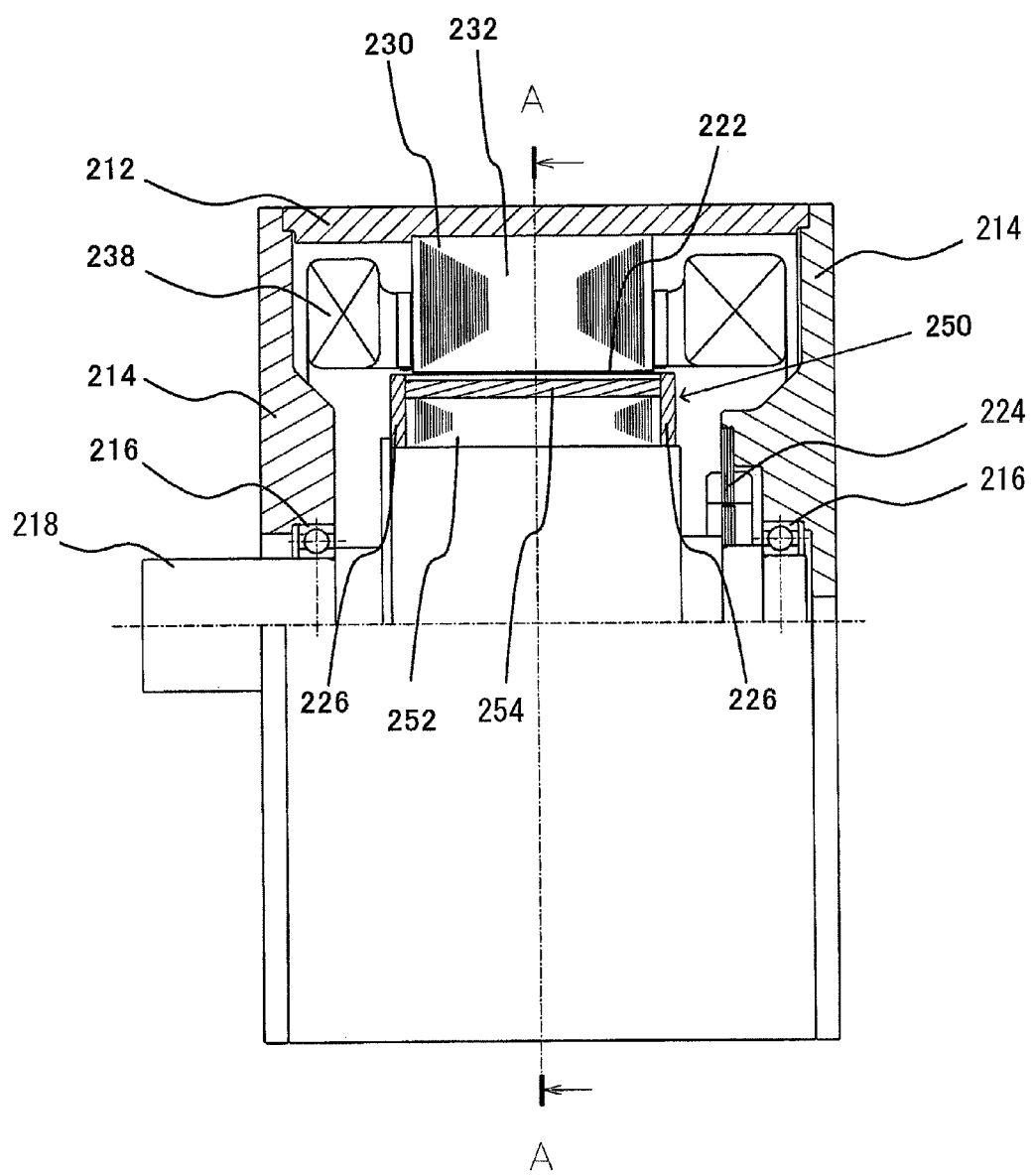

FIG. 3 shows the rotating-electrical machine 200 in FIG. 1 in a sectional view. It is to be noted that since the structure of the rotating-electrical machine 200 is substantially identical to that of the rotating-electrical machine 202, the following description focuses on the structure adopted in the rotating-electrical machine 200, taken as a representative example. However, that the structural features described below do not need to be adopted in both rotating-electrical machines 200 and 202, as long as they are adopted in either one of them.

A stator 230, held inside a housing 212, includes a stator core 232 and a stator winding 238. On the inner circumferential side of the stator core 232, a rotor 250 is rotatably held over an air gap 222. The rotor 250 includes a rotor core 252 fixed onto a shaft 218, permanent magnets 254 and non-magnetic contact plates 226. The housing 212 includes a pair of end brackets 214 at each of which a bearing 216 is disposed. The shaft 218 is rotatably held via the bearings 216.

A resolver 224, which detects the positions of the poles at the rotor 250 and the rotating speed of the rotor 250, is disposed at the shaft 218. An output from the resolver 224 is taken into the control circuit 648 shown in FIG. 2. The control circuit 248 outputs a control signal, generated based upon the output having been taken in, to the drive circuit 652. The drive circuit 652, in turn, outputs a drive signal, generated based upon the control signal, to the power module 610. At the power module 610, a switching operation is executed based upon the control signal so as to convert DC power, provided from the battery 180, to three-phase AC power. This three-phase AC power is provided to the stator winding 238 shown in FIG. 3 and, as a result, a rotating magnetic field is generated at the stator 230. The frequency of the three-phase AC current is controlled based upon a detection value provided by the resolver 224 and the phases of the three-phase AC current relative to the rotor 250, are also controlled based upon the detection value provided by the resolver 224.

Figure 4:
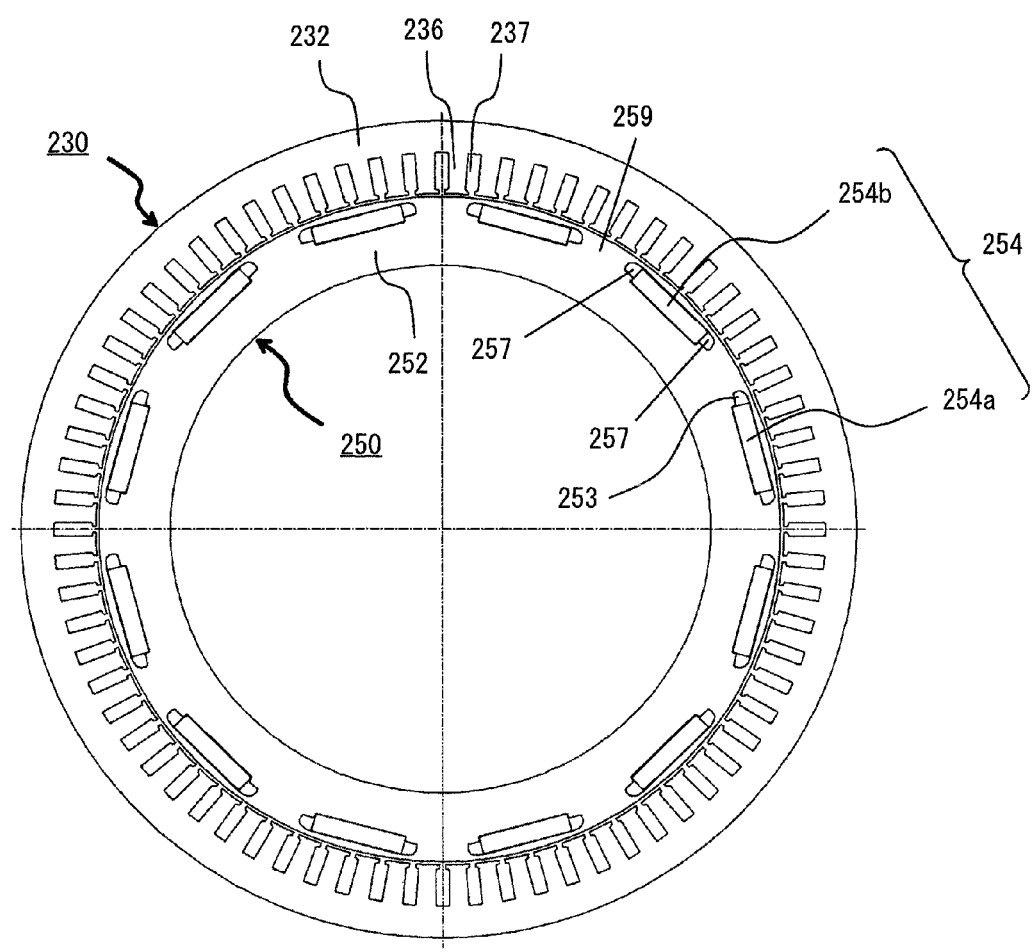

FIG. 4 shows the stator 230 and the rotor 250 in a sectional view taken through A-A in FIG. 3. It is to be noted that FIG. 4 does not include an illustration of the housing 212, the shaft 218 and the stator winding 238. Numerous slots 237 and teeth 236 are formed in a uniform pattern along the entire inner circumference of the stator core 232. Reference numerals are appended to only one representative slot and an adjacent tooth in FIG. 4. Inside the slots 237, a slot insulator (not shown) is disposed and a plurality of phase windings corresponding to a U-phase, a V-phase and a W-phase, constituting the stator winding 238 in FIG. 3, are installed in the slots 237. Seventy two slots 237 are formed over equal intervals in the embodiment.

In addition, twelve holes 253, at which rectangular magnets are to be inserted, are formed near the outer circumference of the rotor core 252, over equal intervals along the circumferential direction. At each hole 253, with the depth thereof ranging along the axial direction, a permanent magnet 254 is embedded and fixed with an adhesive or the like. The holes 253 are formed so as to achieve a greater width, measured along the circumferential direction, compared to the width of the permanent magnets 254 (254*a* and 254*b*) measured along the circumferential direction and thus, hole spaces 257, present on the two sides of each permanent magnet 254, function as magnetic gaps. These hole spaces 257 may be filled with an adhesive or they may be sealed together with the permanent magnets 254 by using a forming resin. The permanent magnets 254 function as field poles of the rotor 250 and the rotor in this embodiment assumes a 12-pole structure.

The permanent magnets 254 are magnetized along the radial direction, and the magnetizing direction is reversed from one field pole to the next. Namely, assuming that the surface of a permanent magnet 254*a* facing toward the stator and the surface of the permanent magnet 254*a* located on the axial side respectively achieve N polarity and S polarity, the stator-side surface and the axial-side surface of a permanent magnet 254*b* disposed next to the permanent magnet 254*a* respectively achieve S polarity and N polarity. Such permanent magnets 254*a* and 254*b* are disposed in an alternate pattern along the circumferential direction.

The permanent magnets 254 may be magnetized first and then embedded in the holes 253, or they may be inserted in the holes 253 at the rotor core 252 in an unmagnetized state and then magnetized by applying an intense magnetic field to the inserted permanent magnets. Once magnetized, the permanent magnets 254 exert a strong magnetic force. This means that if the permanent magnets 254 are polarized before they are fitted at the rotor 250, the strong attracting force occurring between the permanent magnets 254 and the rotor core 252 is likely to present a hindrance during the permanent magnet installation process. Furthermore, the strong attracting force imparted by the permanent magnets 254 may cause foreign matter such as iron dust to settle on the permanent magnets 254. For this reason, it is more desirable, from the viewpoint of maximizing productivity in manufacturing the rotating electrical machine, to magnetize the permanent magnets 254 after they are inserted at the rotor core 252.

The permanent magnets 254 may be neodymium-based sintered magnets, samarium-based sintered magnets, ferrite magnets or neodymium-based bonded magnets. The residual magnetic flux density of the permanent magnets 254 is approximately 0.4 to 1.3 T.

As the rotating magnetic field is induced at the stator 230 by the three-phase AC currents (the three-phase AC currents flowing through the stator winding 238), torque is generated with the rotating magnetic field acting on the permanent magnets 254*a* and 254*b* at the rotor 250. This torque can be expressed as the product of the component in the magnetic flux imparted from the permanent magnets 254, which interlinks with a given phase winding, and the component in the AC current flowing through the phase winding, which is perpendicular to the interlinking magnetic flux. Since the AC currents are controlled so as to achieve a sine waveform, the product of the fundamental wave component in the interlinking magnetic flux and the fundamental wave component in the corresponding AC current represents the time-averaged torque component and the product of the higher harmonic component in the interlinking magnetic flux and the fundamental wave component in the AC current represents the torque ripple, i.e., the higher harmonic component of the torque. This means that the torque ripple can be decreased by reducing the higher harmonic component in the interlinking magnetic flux. In other words, since the product of the interlinking magnetic flux and the angular acceleration with which the rotor rotates represents the induced voltage, reducing the higher harmonic component in the interlinking magnetic flux is equivalent to reducing the higher harmonic component in the induced voltage.

Figure 5:
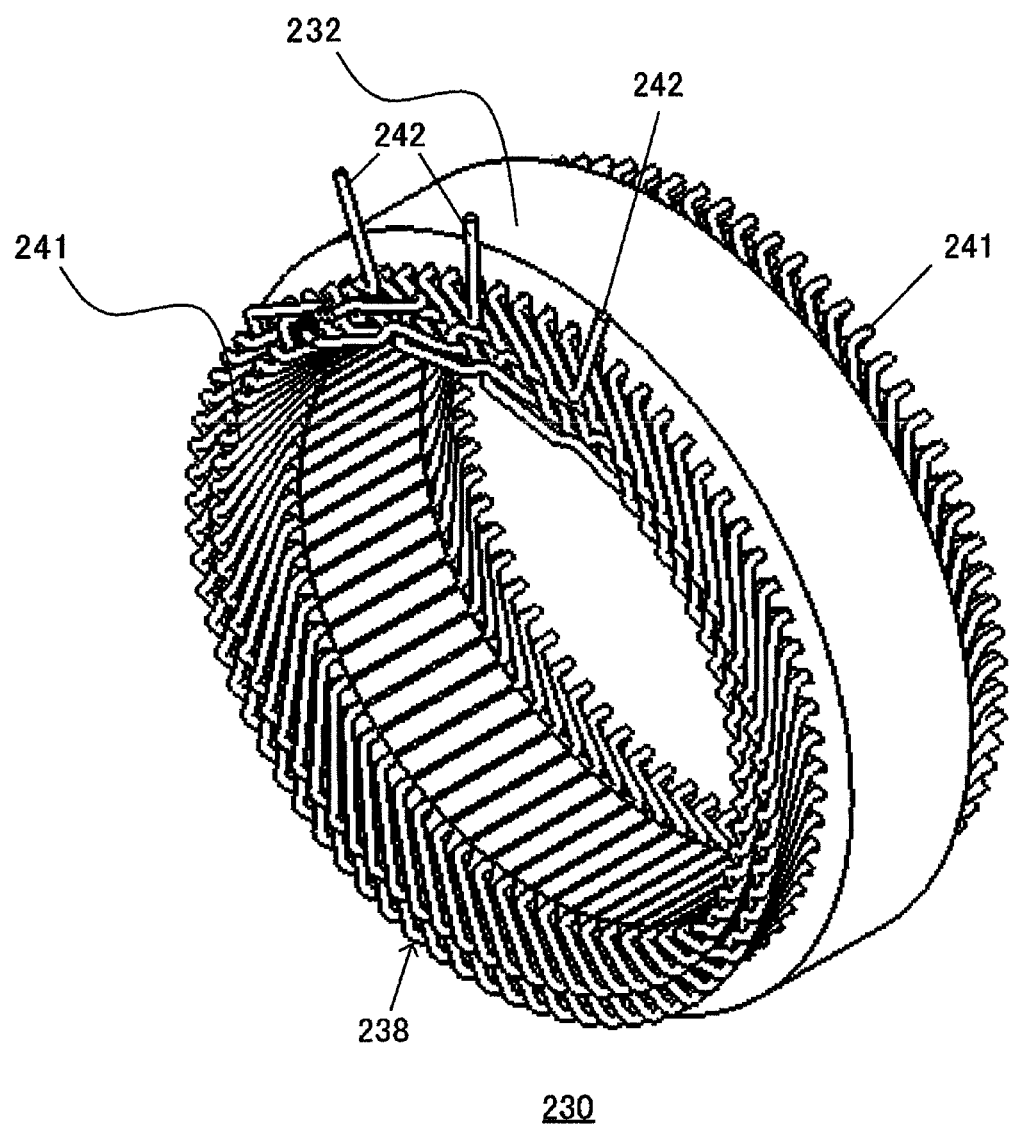

FIG. 5 shows the stator 230 in a perspective. The stator winding 238 in the embodiment is wound around the stator core 232 by adopting a wave winding pattern. Coil ends 241 of the stator winding 238 are formed at the two end surfaces of the stator core 232. In addition, lead wires 242 of the stator winding 238 are led out on the side where one of the end surfaces of the stator core 232 is located. Three lead wires 242 are led out in correspondence to the U-phase, the V-phase and the W-phase.

Figure 6:
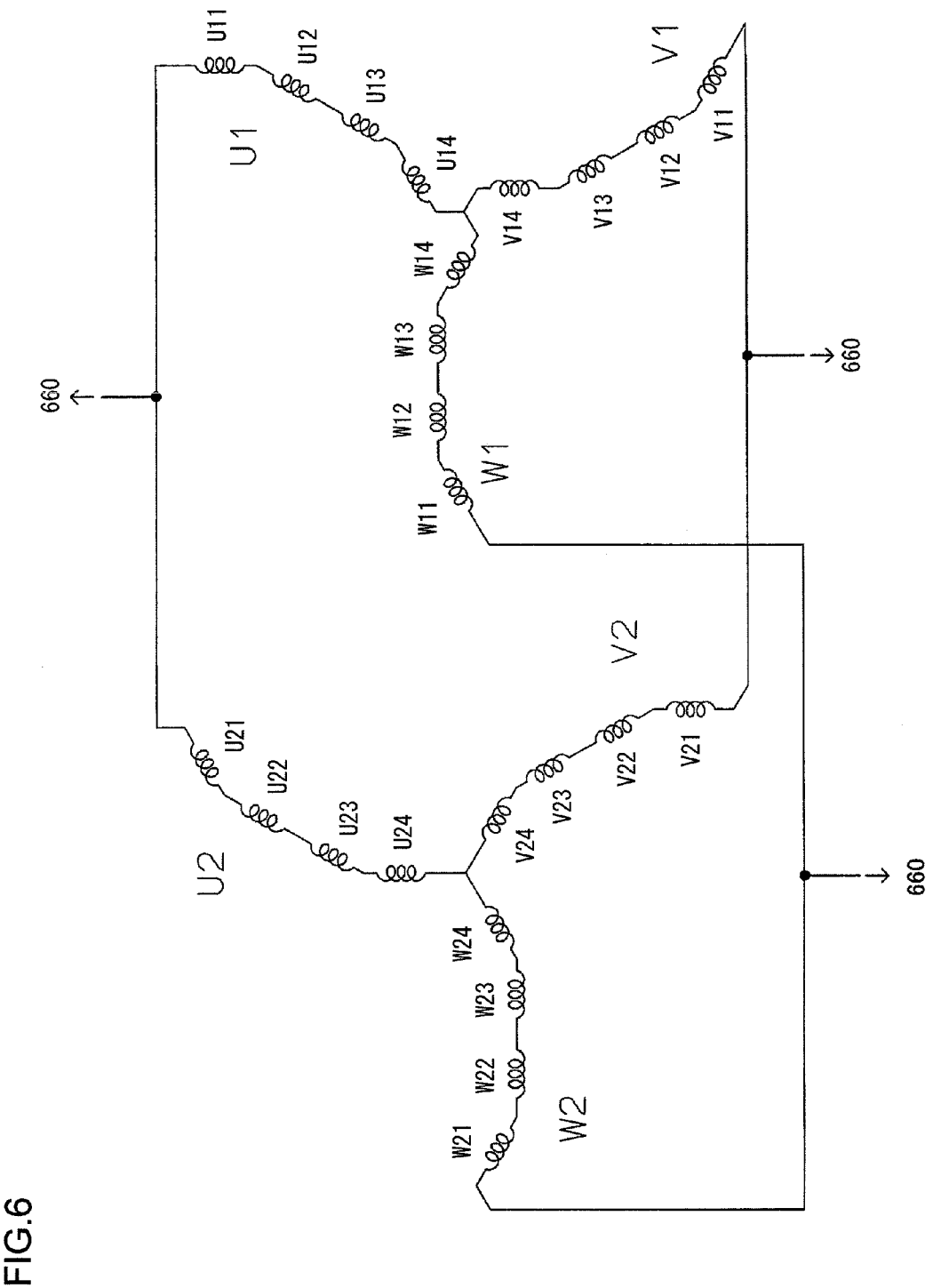

In the connection diagram in FIG. 6 pertaining to the stator winding 238, the connection method and the electrical phase relation among the phases of the individual phase windings are indicated. The stator winding 238 in the embodiment is achieved by adopting a double star connection, in which a first star connection made up with a U1-phase winding group, a V1-phase winding group and a W1-phase winding group is connected in parallel with a second star connection made up with a U2-phase winding group, a V2-phase winding group and a W2-phase winding group. The U1-phase winding group, the V1-phase winding group, the W1-phase winding group, the U2-phase winding group, the V2-phase winding group and the W2-phase winding group are each constituted with four round windings (going-around windings). Namely, the U1-phase winding group includes round windings U11 through U14, the V1-phase winding group includes round windings V11 through V14, the W1-phase winding group includes round windings W11 through W14, the U2-phase winding group includes round windings U21 through U24, the V2-phase winding group includes round windings V21 through V24 and the W2-phase winding group includes round windings W21 through W24.

As shown in FIG. 6, structures substantially identical to that adopted in correspondence to the U phase are assumed for the V phase and the W phase, and the individual phase winding groups in each star connection are disposed so that the phase of the voltage induced at one phase winding group is offset by 120° in electrical angle relative to the phase of the voltage induced at the next phase winding group along a given direction. In addition, the angles formed by the round windings in the individual phase winding groups represent relative phases. While the stator winding 238 in the embodiment is achieved by adopting the double star (2Y) connection with two star connections connected in parallel, as indicated in FIG. 6, the stator winding 238 may instead adopt a single star (1Y) connection with two star connections connected in series, depending upon the level of voltage required to drive the rotating electrical machine.

Figure 7:
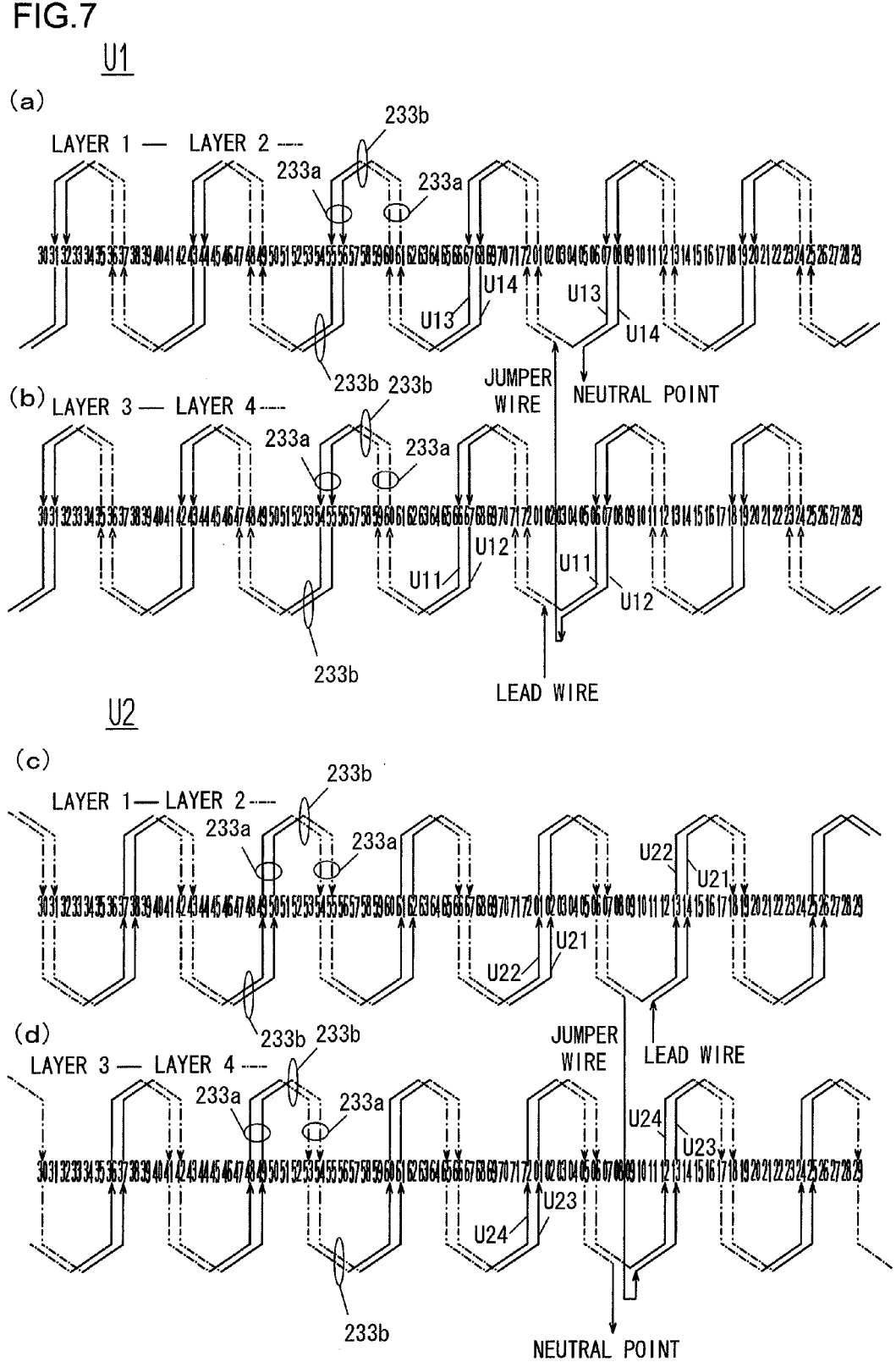

FIG. 7 provides a detailed connection diagram pertaining to the U-phase winding groups constituting part of the stator winding 238, with FIG. 7(*a*) showing the round windings U13 and U14 in the U1-phase winding group, FIG. 7(*b*) showing the round windings U11 and U12 in the U1-phase winding group, FIG. 7(*c*) showing the round windings U21 and U22 in the U2-phase winding group and FIG. 7(*d*) showing the round windings U23 and U24 in the U2-phase winding group. As explained earlier, seventy-two slots 237 are formed at the stator core 232 (see FIG. 4) and reference numerals 01, 02, ~71, 72 in FIG. 7 are slot numbers each assigned to a specific slot.

The following description will be given by referring to a portion of a round winding that is inserted through a slot as a slot conductor and referring to a portion of the round winding that ranges astride slots as a cross conductor. The round windings U1 through U24 are each made up with slot conductors 233*a* inserted through slots and cross conductors 233*b* each connecting the ends of slot conductors 233*a* inserted through different slots, which are located on a specific side, so as to form a coil end 241 (see FIG. 5). For instance, the end of a slot conductor 233*a* inserted through the slot 237 assigned with slot No. 55 in FIG. 7(*a*), located on the upper side in the figure, is connected to the upper-side end of a slot conductor 233*a* inserted through the slot 237 assigned with slot No. 60 via a cross conductor 233*b* that forms an upper coil end, whereas the lower end of a slot conductor 233*a* inserted through the slot 237 assigned with slot No. 55 is connected to the lower end of the slot conductor 233*a* inserted through the slot 237 assigned with slot No. 48 via a cross conductor 233*b* that forms a lower coil end. A round winding with a wave winding pattern is formed by connecting the slot conductors 233*a* via the cross conductors 233*b* as described above.

As will be explained in further detail later, four slot conductors 233*a* are inserted side-by-side, from the inner circumferential side through the outer circumferential side, within each slot in the embodiment. These four slot conductors will be referred to as a layer 1, a layer 2, a layer 3 and a layer 4, starting on the innermost side and moving toward the outer side. In FIG. 7, slot conductors in the round windings U13, U14, U21 and U22, each forming the layer 1, are indicated by solid lines and slot conductors in the round windings U13, U14, U21 and U22, each forming the layer 2, are indicated by the one-point chain lines. Slot conductors in the round windings U11, U12, U23 and U24, each forming the layer 3, are indicated by solid lines and slot conductors in the round windings U11, U12, U23 and U24, each forming the layer 4, are indicated by the one-point chain lines.

It is to be noted that the round windings U11 through U24 may each be formed by using a continuous single-piece conductor or they may each be formed by first inserting segment coils (segment conductors) through the slots and then connecting the segment coils through welding or the like. The use of the segment coils is advantageous in that coil ends 241 located at the two ends facing opposite each other along the axial direction, further beyond the ends of the stator core 232, can be formed in advance before inserting the segment coils through the slots 237, which makes it possible to easily create an optimal insulation distance between different phases or within a given phase. Such an optimal insulation distance is bound to assure effective insulation through deterrence of partial discharge attributable to a surge voltage caused as the IGBTs 21 are engaged in switching operation.

In addition, while the conducting material used to form the round windings may be a flat rectangular wire or a round wire or may be a conducting material made up with numerous thin wires bundled together, the round winding is ideally formed by using a flat wire so as to maximize the space factor to ultimately achieve a compact rotating electrical machine assuring higher output and achieve higher efficiency.

Figure 8:
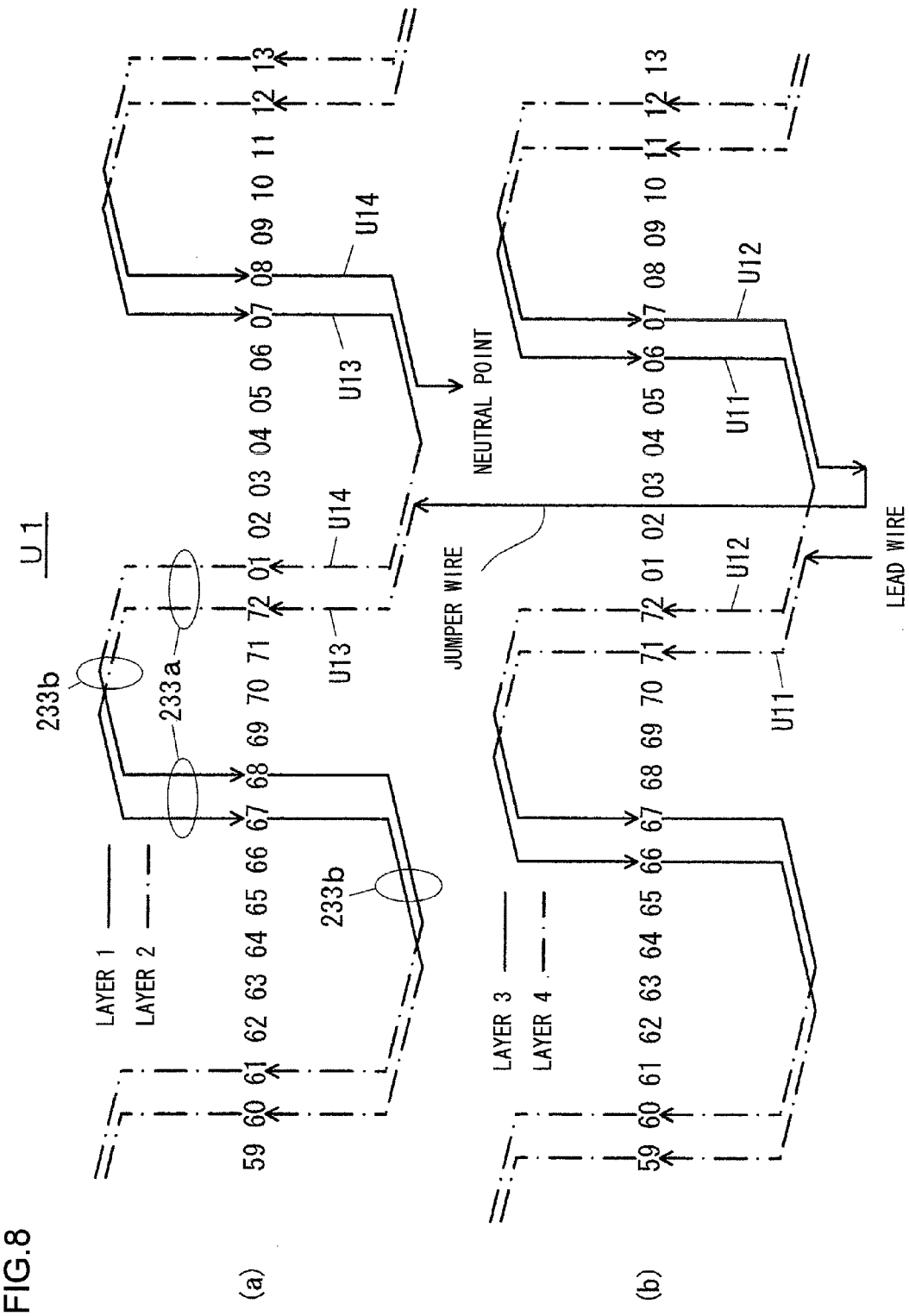
Figure 9:
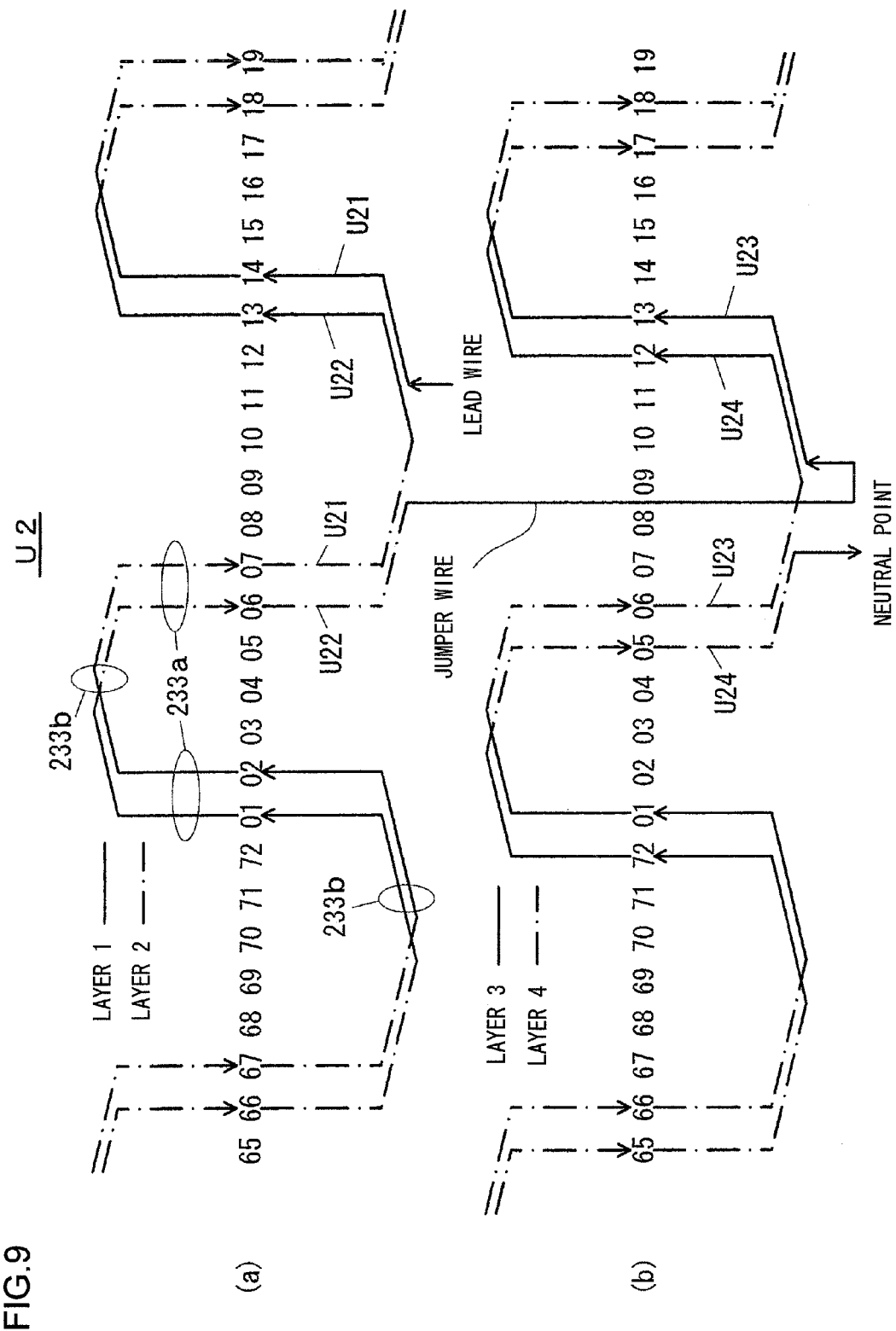

FIGS. 8 and 9 respectively provide enlarged views of parts of the U1-phase winding group and the U2-phase winding group in FIG. 7. FIGS. 8 and 9 each provide a view of a part of the U1-phase winding group or the U2-phase winding group accounting for approximately four poles, which includes the area where a jumper wire is present. As shown in FIG. 8(b), the stator winding group U1, starting at the lead wire, enters the slot assigned with slot No. 71 as a layer-4 slot conductor, and then extends a cross conductor 233b astride a range equivalent to five slots as before entering the slot assigned with slot No. 66 as a layer-3 slot conductor 233a. Then, it leaves the layer-3 position in the slot assigned with slot No. 66, runs astride a range equivalent to seven slots and moves into the slot assigned with slot No. 59 as a layer-4 slot conductor.

In other words, the stator winding is wound by assuming a wave winding pattern until it encircles the stator core 232 by a full turn as it takes the layer-3 position in the slot assigned with slot No. 06 with its cross conductors 233b located on the coil end side (the lower side in the figure) where the lead wire is led out, each running astride slots with the slot pitch Np set to 7 and its cross conductors 233b, located on the opposite coil end side each running astride slots with the slot pitch Np set to 5. This stator winding encircling the stator core by substantially a full turn forms the round winding U11 shown in FIG. 6.

Next, the stator winding, having left the layer-3 position in the slot assigned with slot No. 06, runs astride a range equivalent to six slots and then moves into the slot assigned with slot No. 72 as a layer-4 slot conductor. The portion of the stator winding at the layer-4 position in the slot assigned with slot No. 72 and beyond constitutes the round winding U12 shown in FIG. 6. As is the round winding U11, the round winding U12 is formed by wave-winding the stator winding so as to encircle the stator core 232 by a full turn until it takes the layer-3 position in the slot assigned with slot No. 06, with the cross conductors 233b located on the side where the lead wire is present, each running astride slots with the slot pitch Np set to 7 and the cross conductors 233b located on the opposite side each running astride slots with the slot pitch Np set to 5. This stator winding encircling the stator core by substantially a full turn forms the round winding U12.

It is to be noted that since the round winding U12 is wound around the stator core with an offset relative to the round winding U11, which is equivalent to a 1-slot pitch, a phase difference in electrical angle equivalent to the 1-slot pitch, manifests. The 1-slot pitch is equivalent to 30° in electrical angle in the embodiment, and accordingly, FIG. 6 clearly shows that the round winding U11 and the round winding U12 are offset relative to each other by 30°.

The stator winding, having left the layer-3 position in the slot assigned with slot No. 07 moves into the slot assigned with slot No. 72 as a layer-2 slot conductor (see FIG. 8(a)) via the jumper wire running astride a range equivalent to seven slots. Subsequently, the stator winding is wound around the stator core 232 so as to encircle the stator core 232 by a full turn, from the layer-2 position in the slot assigned with slot No. 72 through the layer-1 position in the slot assigned with slot No. 07, with the cross conductors 233b located on the side where the lead wire is present each running astride slots with the slot pitch Np set to 7 and the cross conductors 233b, located on the opposite side each running astride slots with the slot pitch Np set to 5, in much the same way as that with which the stator winding forms the round windings U11 and U12. This stator winding encircling the stator core by substantially a full turn forms the round winding U13 shown in FIG. 6.

It is to be noted that, as FIG. 8 clearly indicates, the round winding U13 is wound without an offset relative to the round winding U12 along the circumferential direction. This means that there is no phase difference between the round winding U12 and the round winding U13. Accordingly, FIG. 7 shows the round windings U12 and U13 without any phase difference manifesting between them.

Lastly, the stator winding, having left the layer-1 position in the slot assigned with slot No. 07, runs astride a range equivalent to six slots and then moves into the slot assigned with slot No. 01 as a layer-2 slot conductor. Subsequently, the stator winding is wound around the stator core 232 so as to encircle the stator core 232 by a full turn, from the layer-2 position in the slot assigned with slot No. 01 through the layer-1 position in the slot assigned with slot No. 08, with the cross conductors 233b, located on the side where the lead wire is present, each running astride slots with the slot pitch Np set to 7 and the cross conductors 233b, located on the opposite side, each running astride slots with the slot pitch Np set to 5, in much the same way as that with which the stator winding forms the round windings U11, U12 and U13. This stator winding encircling the stator core by substantially a full turn forms the round winding U14 shown in FIG. 6.

It is to be noted that since the round winding U14 is wound around the stator core with an offset relative to the round winding U13 by a 1-slot pitch, a phase difference in electrical angle equivalent to the 1-slot pitch, manifests. Accordingly, FIG. 8 clearly shows that the round winding U13 and the round winding U14 are offset by 30°.

The round windings in the stator winding group U2 shown in FIG. 9, too, are wound with a wave winding pattern with the cross conductors running astride slots with the slot pitches set as in the stator winding group U1. The round winding U21 is wound around so as to encircle the stator core from the layer-1 position in the slot assigned with slot No. 14 through the layer-2 position in the slot assigned with slot No. 07, whereas the round winding U22 is wound around so as to encircle the stator core from the layer-1 position in the slot assigned with slot No. 13 through the layer-2 position in the slot assigned with slot No. 06. Subsequently, the stator winding, having left the layer-2 position in the slot assigned with slot No. 06 moves into the slot assigned with slot No. 13 as a layer-3 slot conductor via the jumper wire and is wound around as the round winding U23 until it enters the slot assigned with slot No. 06 as a layer-4 slot conductor. Subsequently, the stator winding is wound so as to encircle the stator core from the layer-3 position in the slot assigned with slot No. 12 through the layer-4 position in the slot assigned with slot No. 05, thereby forming the round winding U24.

As described above, the stator winding group U1 is made up with the round windings U11, U12, U13 and U14, and a voltage representing the sum of the voltages generated at the various phases assumed for the individual round windings combined together is induced at the stator winding group U1. Likewise, the voltage representing the sum of the voltages generated at the various phases assumed for the round windings U21, U22, U23 and U24 combined together is induced at the stator winding group U2. While the stator winding group U1 and the stator winding group U2 are connected in parallel as shown in FIG. 6, there is no phase difference between the voltage induced at the stator winding group U1 and the voltage induced at the stator winding group U2 and, for this reason, imbalanced conditions manifesting as, for instance, a circulating current, do not occur even though the stator winding groups U1 and U2 are connected in parallel.

In addition, the cross conductors 233b are each made to run astride slots with the slot pitch Np set to (number of slots per pole +1) on one coil end side and are each made to run astride slots with the slot pitch Np set to (number of slots per pole −1) on the other coil end side. Furthermore, the round windings are wound by ensuring that there is no phase difference between the round winding U12 and the round winding U13 and that there is no phase difference between the round winding U22 and the round winding U23. Through these measures, a positional arrangement such as that shown in FIG. 10 is achieved for the slot conductors 233a.

Figure 10:
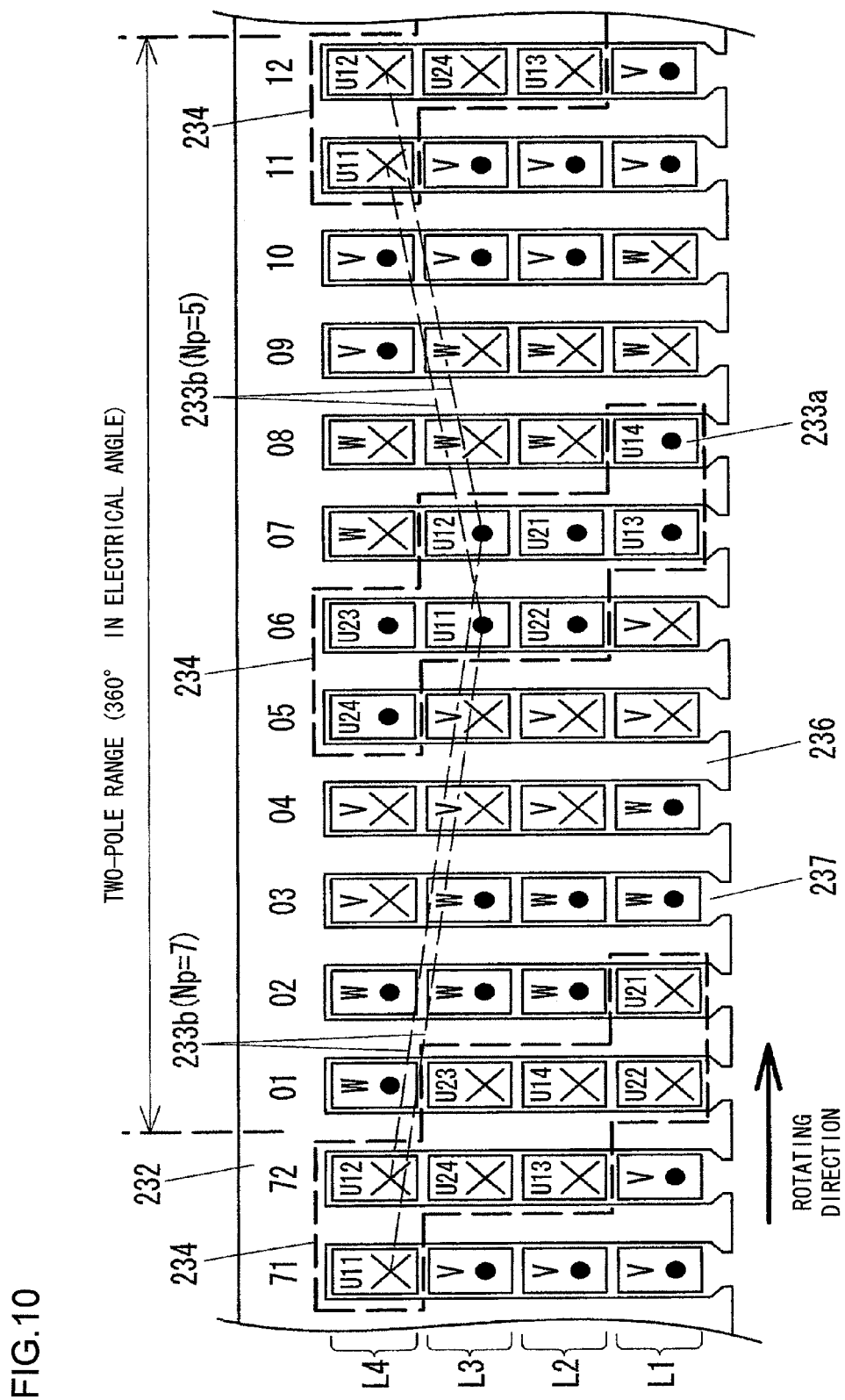

FIG. 10 shows the positional arrangement with which the slot conductors 233a are disposed at the stator core 232 in a view illustrating the part of the stator core 232 ranging from the slots No. 71 through slot No. 12 in FIGS. 7 through 9. It is to be noted that the rotor rotates along the direction running from the left side of the figure toward the right side of the figure. In the embodiment, twelve slots 237 are formed in correspondence to two poles, i.e., over the 360° range in electrical angle. This means that the range from slot No. 01 through slot No. 12 in FIG. 10, for instance, corresponds to two poles. Thus, the number of slots per pole is six, whereas the number of slots per phase per pole NSPP is 2 (=6/3). Four slot conductors 233a in the stator winding 238 are inserted at each slot 237.

Inside each rectangle representing a slot conductor 233a, a specific code among codes U11 through U24, V and W indicating the U-phase, the V-phase and the W-phase, and a filled circle mark "●" indicating the direction running from the lead wire toward the neutral point or a cross mark "×" indicating the opposite direction are shown. In addition, a slot conductor 233a present on the innermost circumferential side of the slot 237 (toward the bottom of the slot) will be referred to as a layer-1 slot conductor, and the subsequent slot conductors 233a in a slot 237 will be referred to as a layer-2 slot conductor, which is set next to the innermost slot conductor 233a, a layer-3 slot conductor and a layer-4 slot conductor, which is located on the outermost circumferential side (closest to the slot opening). In addition, reference numerals 01 through 12 are slot numbers similar to those shown in FIGS. 7 through 9. It is to be noted that the U-phase slot conductors 233a alone are appended with the codes U11 through U24 indicating the corresponding round windings, whereas the V-phase slot conductors 233a and the W-phase slot conductors 233a are appended with the codes V and W, simply indicating the corresponding phases.

The eight slot conductors 233a inside each dotted-line enclosure 234 in FIG. 10 are all U-phase slot conductors 233a. For instance, the slot conductor group 234 inside the central enclosure includes slot conductors 233a in the round windings U24 and U23 assuming the layer-4 positions in the slots assigned with slot Nos. 05 and 06 respectively, slot conductors 233a in the round windings U11 and U12 assuming the layer-3 positions in the slots assigned with the slot Nos. 06 and 07 respectively, slot conductors 233a in the round windings U22 and U21 assuming layer-2 positions in the slots assigned with the slot Nos. 06 and 07 respectively and slot conductors 233a in the round windings U13 and U14 assuming the layer-1 positions in the slots assigned with the slot Nos. 07 and 08 respectively.

When the number of slots per pole is six, the number of slots per phase per pole is 2 and the number of slot conductors 233 inserted in layers in each slot 237 is 4, the U-phase slot conductors 233a (and the V-phase slot conductors 233a and the W-phase slot conductors 233a) are often disposed by adopting a positional arrangement such as that shown in FIG. 11(a). In this positional arrangement, the slot conductor group on the right-hand side in the figure and the slot conductor group on the left-hand side in the figure are set apart from each other with a six-slot pitch.

The positional arrangement shown in FIG. 11(b), which is adopted in the embodiment, is distinguishable from the arrangement in that the pair of slot conductors 233a in layer 1 (L1) in each slot conductor group is offset by a one slot pitch along the direction in which the rotor rotates (toward the right side in the figure) and that the pair of slot conductors 233a in layer 4 (L4) in the slot conductor group is offset by one slot pitch along the direction opposite from the rotating direction (toward the left side in the figure). As a result, the cross conductor 233 connecting the slot conductor 233a in the round winding U11 taking up the layer-4 position and the slot conductor 233a in the round winding U11 taking up the layer-three (L3) position runs astride slots with a 7-slot pitch, whereas the cross conductor 233 connecting the slot conductor 233a in the round winding U24 taking up the layer-4 position and the slot conductor 233a in the round winding U24 taking up the layer-three (L3) position runs astride slots with a 5-slot pitch. It is to be noted that the direction opposite from the direction along which the rotor rotates will be referred to as a reverse rotating direction in the following description.

In this positional arrangement, the corresponding slot conductors 233a in slot conductor groups corresponding to the V-phase and the W-phase, as well as the slot conductors 233a corresponding to the U-phase, are disposed with a one-slot pitch offset and, as a result, slot conductor groups 234 achieving identical shapes are formed in correspondence to the U-phase, the V-phase and the W-phase, as shown in FIG. 10. Namely, a slot conductor group made up with slot conductors 233b corresponding to the U-phase and each appended with the filled circle mark, a slot conductor group made up with slot conductors 233b corresponding to the W-phase and each appended with the cross mark, a slot conductor group made up with slot conductors 233b corresponding to the V-phase and each appended with the filled circle mark, a slot conductor group made up with slot conductors 233b corresponding to the U-phase and each appended with the cross mark, a slot conductor group made up with slot conductors 233b corresponding to the W-phase and each appended with the filled circle mark, and a slot conductor group made up with slot conductors 233b corresponding to the V-phase and each appended with the cross mark are formed in this order along the direction in which the rotor rotates.

As shown in FIG. 10, the positional arrangement achieved in the embodiment is characterized in that:

(a) the cross conductors 233b connect slot conductors 233a by each running astride slots with the slot pitch Np set to N+1 (=7) on one coil end side and each running astride slots with the slot pitch Np set to N−1 (=5) on the other coil end side with N (=6) representing the number of slots per pole;

(b) the stator winding includes slot conductor groups 234 each made up with a set of slot conductors 223b corresponding to a single phase, which are inserted through a predetermined number Ns (=4) of successive slots forming a continuous range along the circumference of the stator core so as to take up successive slot positions and layer positions; and (c) the predetermined number of slots Ns is set so that Ns=NSPP+NL=4 with NSPP=(2) representing the number of slots per phase per pole, when the number of layers is 2×NL (NL=2).

It is to be noted that when slot conductors 223b are set to take up successive slot positions and successive layer positions, the slot conductors taking up matching layer positions are inserted at successive slots 237 and the slot conductors inserted through a single slot 237 take up successive layer positions, as shown in FIG. 10. In the description of the embodiment, a set of slot conductors 233a disposed by adopting this positional arrangement will be referred to as a slot conductor group 234.

By forming the slot conductor groups 234 each made up with slot conductors 233b corresponding to a single phase and disposed over a four-slot range as described above, the extent of torque ripple can be reduced, which, in turn, makes it possible to reduce noise in the rotating electrical machine and thus fulfill the object of noise reduction in the rotating electrical machine set forth earlier.

Figure 12:
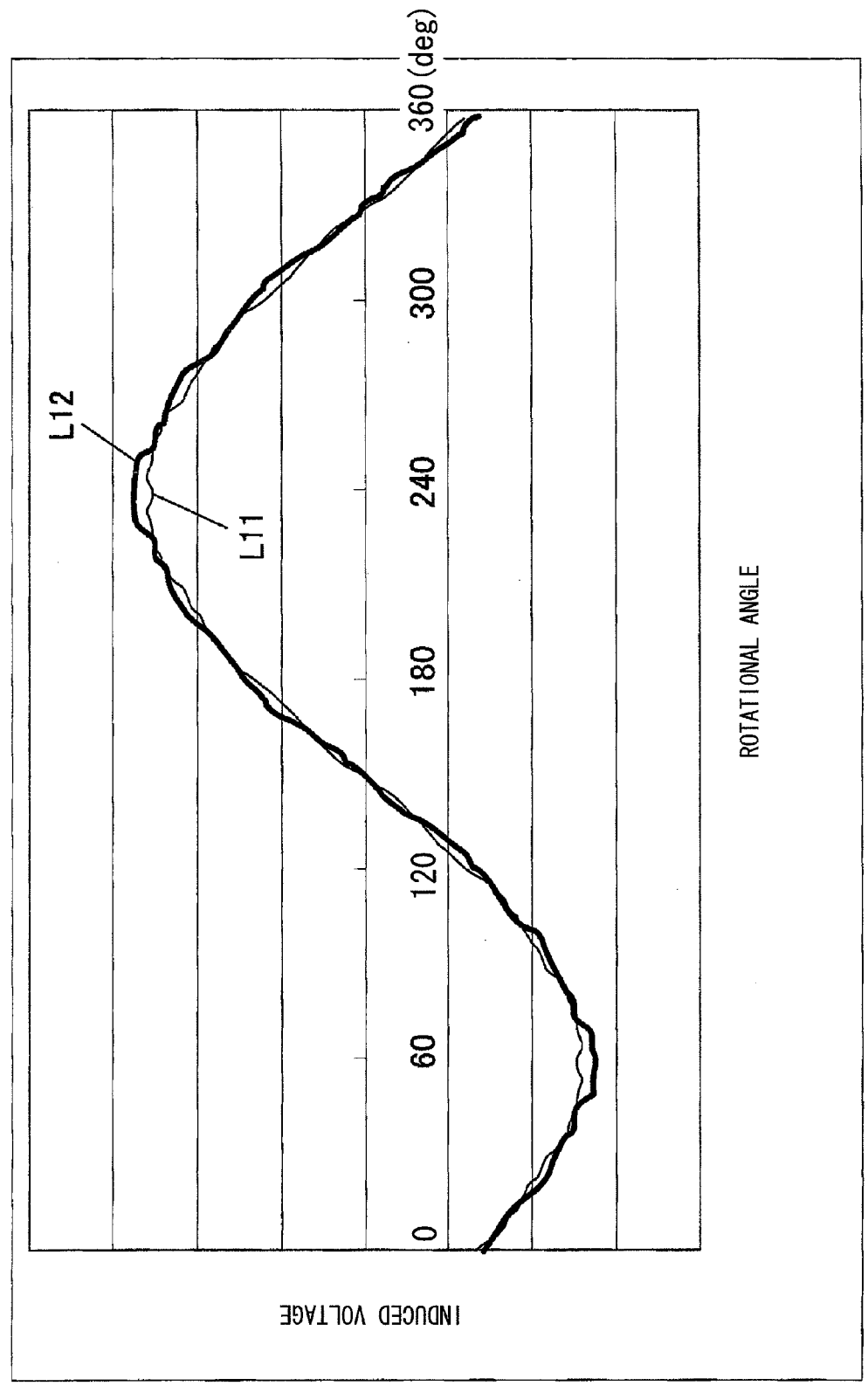
Figure 13:
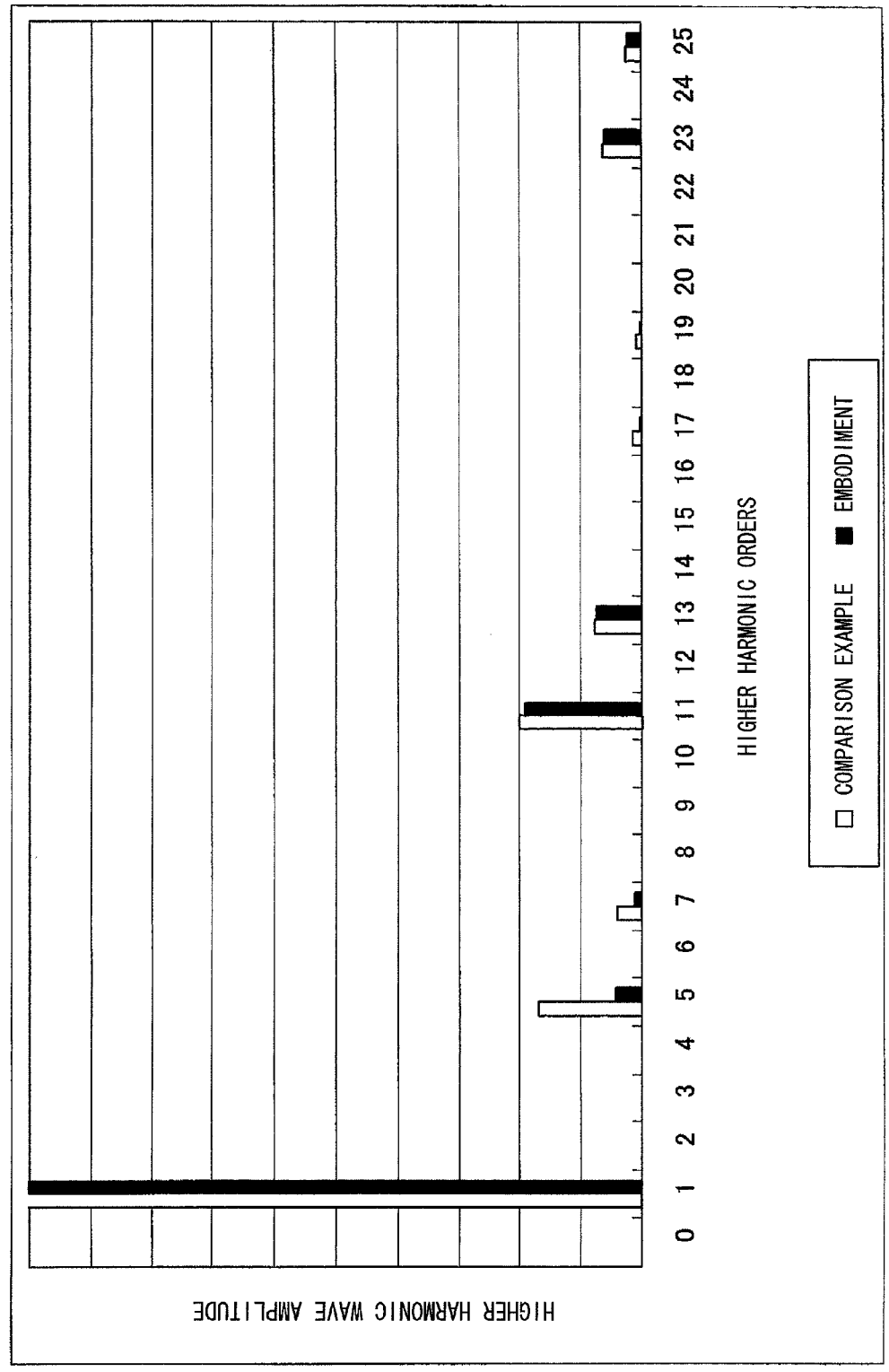

FIG. 12 is a waveform diagram of induced voltages. A curve L11 represents the waveform of the voltage induced in the rotating electrical machine achieved in the embodiment by adopting the slot conductor positional arrangement shown in FIG. 10, whereas a curve L12 represents the waveform of the voltage induced in a comparison example adopting the structure disclosed in patent literature 1. In addition, FIG. 13 presents the results obtained by conducting higher harmonic analysis on the induced voltage waveforms shown in FIG. 12.

FIG. 12 indicates that the induced voltage waveform represented by the curve L11 more closely resembles the sine wave than the induced voltage waveform represented by the curve L12. In addition, the higher harmonic analysis results presented in FIG. 13 indicate that the fifth-order higher harmonic component and the seventh order higher harmonic component can be reduced by significant extents through the embodiment.

Figure 14:
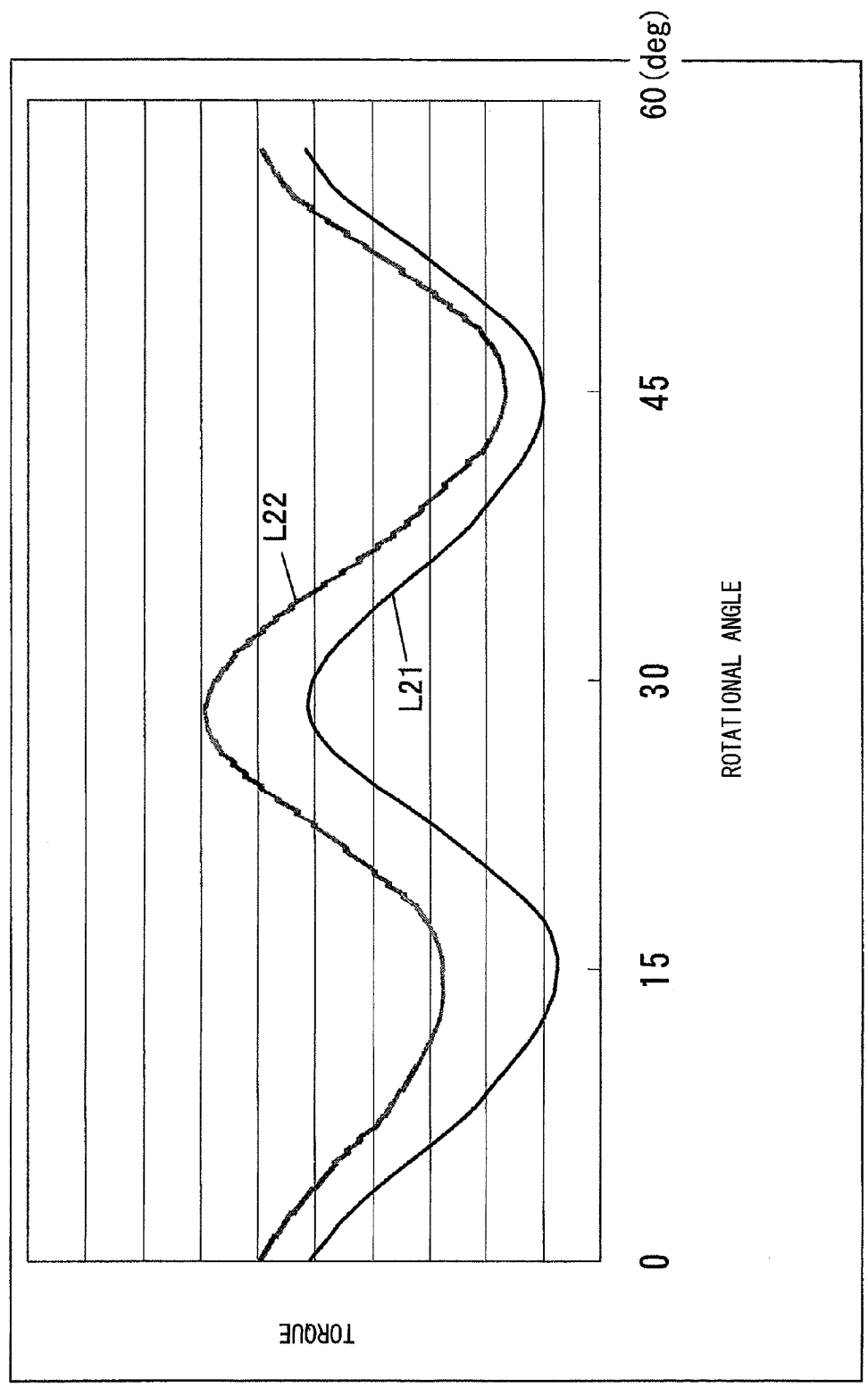
Figure 15:
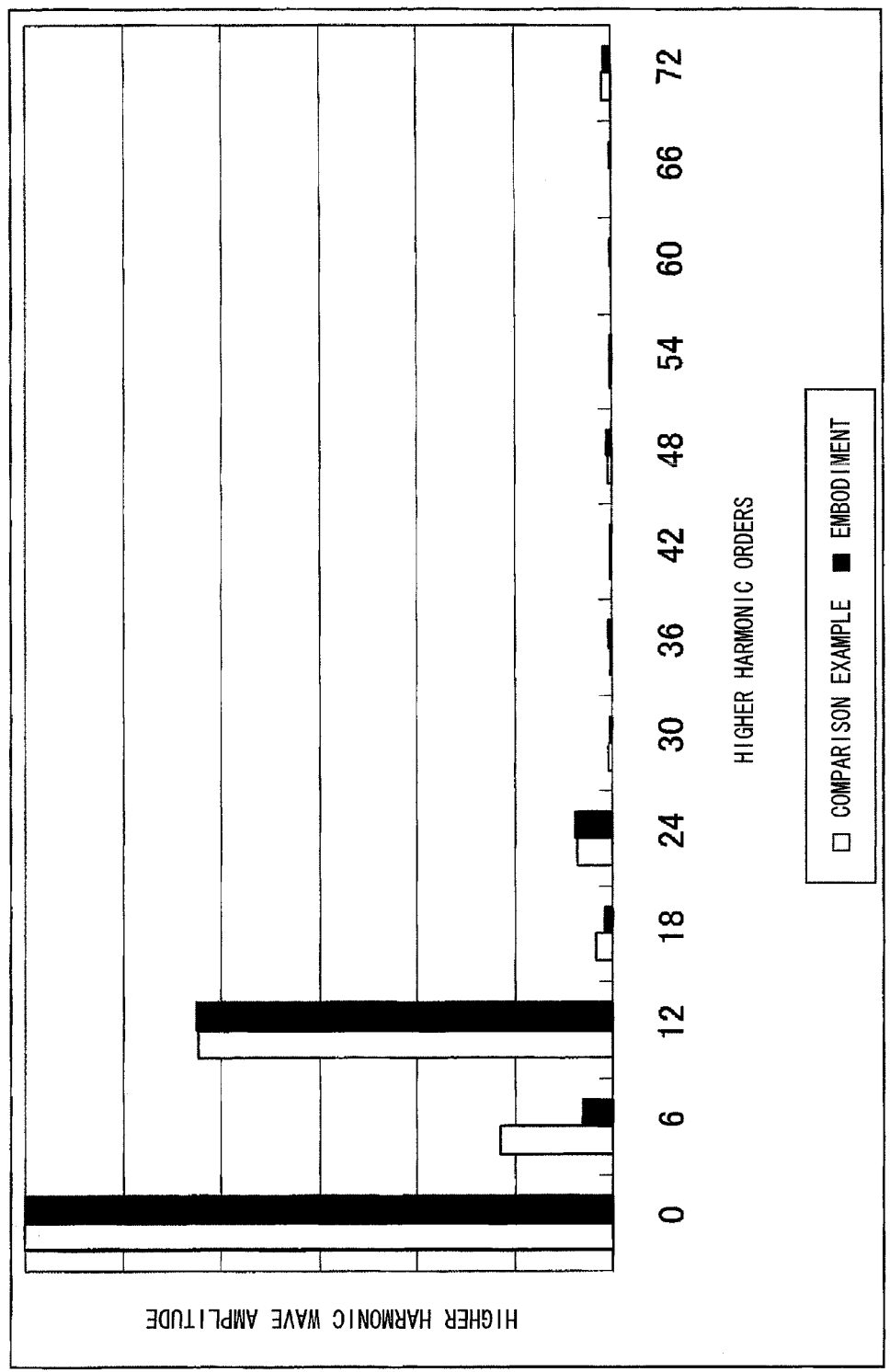

FIG. 14 is a waveform diagram indicating torque waveforms achieved by supplying an AC current in the rotating electrical machine in the embodiment and in the rotating electrical machine in the comparison example. In addition, FIG. 15 presents the results obtained by conducting higher harmonic analysis on the torque waveforms in FIG. 14. The higher harmonic analysis results presented in FIG. 15 indicate that the sixth-order torque ripple, in particular, can be reduced by a significant extent through the embodiment. The decrease in sixth-order torque ripple indicates that the fifth-order component and the seventh order component in the induced voltage, i.e., the interlinking magnetic flux, can be reduced by winding the round windings with the arrangement illustrated in FIGS. 7 through 10.

Second Embodiment

Figure 16:
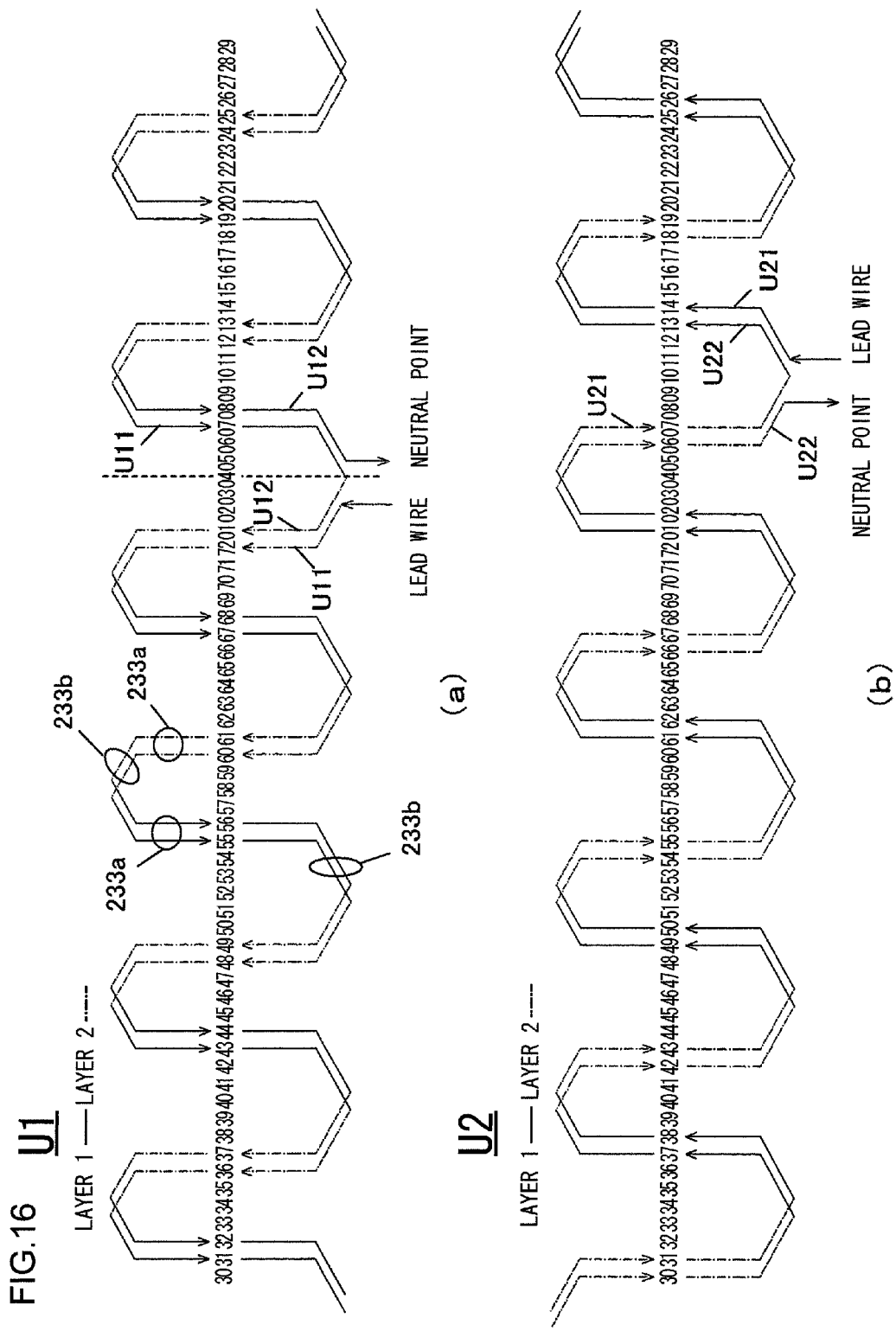
Figure 17:
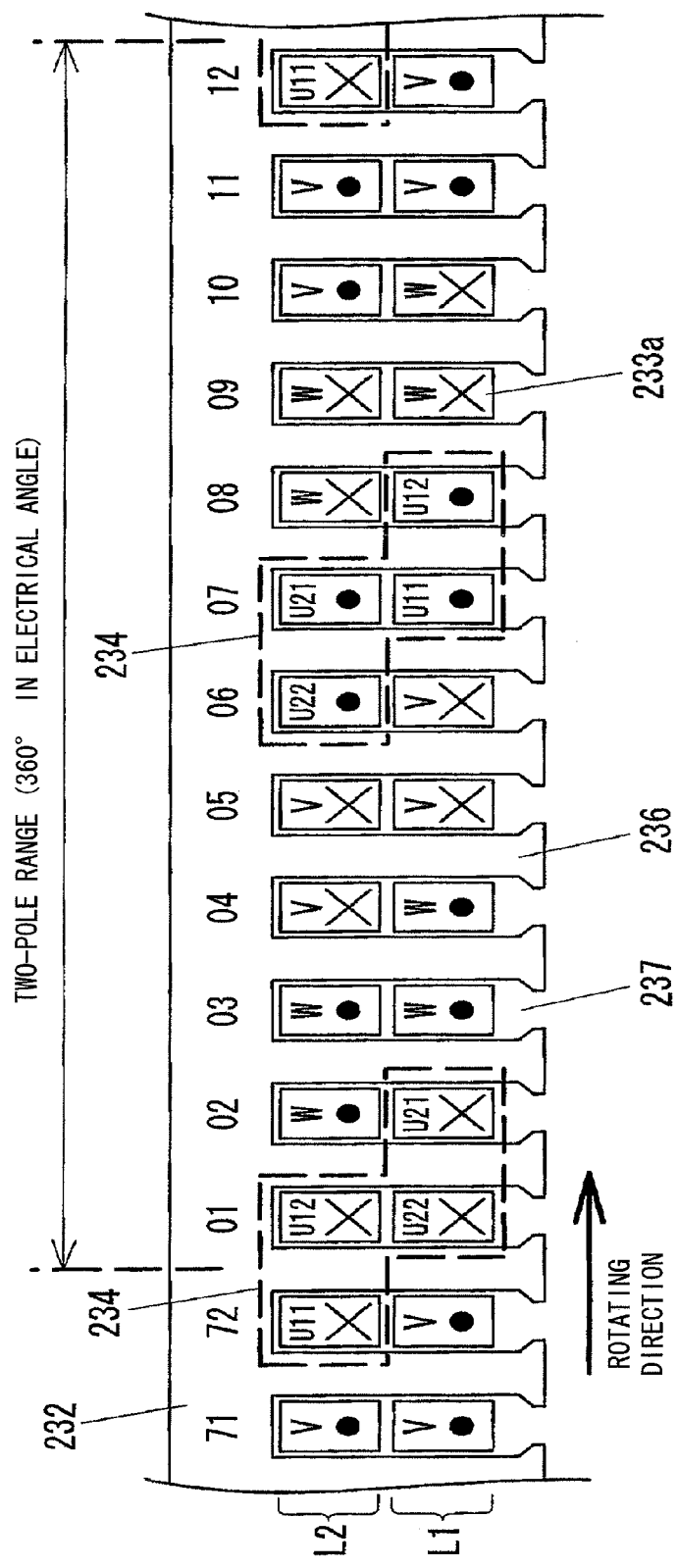

FIGS. 16 and 17 illustrate the second embodiment of the present invention achieved by adopting the present invention in a stator with the number of slots per phase per pole NSPP set to 2 and slot conductors 233a inserted in each slot 237 in two layers. FIG. 16 is a detailed connection diagram pertaining to the U-phase winding constituting part of the stator winding, with FIG. 16(a) showing the U1-phase winding group and FIG. 16(b) showing the U2-phase winding group. FIG. 17 shows the positional arrangement with which the slot conductors 233a are disposed at the stator core 232.

As shown in FIG. 16(b), the round winding U11 in the U1-phase winding group, starting at the lead wire, enters the slot assigned with slot No. 72 as a layer-2 slot conductor, and then extends astride a range equivalent to five slots as a cross conductor 233b before reaching the slot assigned with slot No. 67 as a layer-1 slot conductor. Then, it leaves the layer-1 position in the slot assigned with slot No. 67, runs astride a range equivalent to seven slots and moves into the slot assigned with slot No. 60 as a layer-2 slot conductor. Subsequently, the round winding is continuously wound in a wave winding pattern with the cross conductors running astride the five slot range and the seven slot range alternately until it is inserted through the slot assigned with slot No. 07 as a layer-1 slot conductor after encircling the stator core 232 by substantially a full turn. The winding ranging from the lead wire through the layer-1 position in the slot assigned with slot No. 07 forms the round winding U11.

The winding, having left the layer-1 position in the slot assigned with slot No. 07 runs astride a range equivalent to six slots then moves into the slot assigned with slot No. 01 as a layer-2 slot conductor. The round winding U12, which starts at the layer-2 position in the slot assigned with slot No. 01, is continuously wound with the wave winding pattern with the cross conductors running astride the five slot range and the seven slot range alternately, as in the round winding U11, until it moves into the slot assigned with slot No. 08 as a layer-1 slot conductor after encircling the stator core 232 by substantially a full turn.

The round windings in the U2-phase winding group, too, are wound with a wave winding pattern as are the round windings in the U1-phase winding group. The round winding U21 is wound with a wave winding pattern ranging from the layer-1 position in the slot assigned with slot No. 14 through the layer-2 position in the slot assigned with slot No. 07, whereas the round winding U22 is wound with a wave winding pattern ranging from the layer-1 position in the slot assigned with slot No. 13 through the layer-2 position in the slot assigned with slot No. 06.

FIG. 17 shows the positional arrangement with which the slot conductors 233a are disposed at the slots assigned with slot Nos. 01 through 12 and slot Nos. 71 and 72. In this figure, the 12-slot pitch covering the slot assigned with slot No. 01 through the slot assigned with slot No. 12 corresponds to two poles. The positional arrangement with which the slot conductors 233a corresponding to the U-phase, the V-phase and the W-phase are disposed as shown in FIG. 17 is identical to the positional arrangement with which the slot conductors 233a are disposed to take up layer-1 and layer-2 positions in FIG. 10. In the embodiment, the set of four slot conductors 233a inside each dotted line enclosure forms a single slot conductor group 234.

The slot conductor groups 234 formed in the embodiment, too, satisfy conditions similar to those having been described in reference to the slot conductor groups 234 (see FIG. 10) in the first embodiment. Namely:

(a) the cross conductors 233b connect slot conductors 233a by each running astride slots with the slot pitch Np set to N+1 (=7) on one coil end side and each running astride slots with the slot pitch Np set to N−1 (=5) on the other coil end side with N (=6) representing the number of slots per pole;

(b) the stator winding includes slot conductor groups 234 each made up with a set of slot conductors 223b corresponding to a single phase, which are inserted through a predetermined number Ns (=3) of consecutive slots forming a continuous range along the circumference of the stator core so as to take up successive slot positions and layer positions; and (c) the predetermined number of slots Ns is set so that Ns=NSPP+NL=3 with NSPP (=2) representing the number of slots per phase per pole, when the number of layers is 2×NL (NL=1).

Consequently, the extent of torque ripple can be reduced and thus noise in the rotating electrical machine is reduced, thereby ultimately achieving the object set fourth earlier, of noise reduction in the rotating electrical machine, as in the first embodiment.

Third Embodiment

Figure 19:
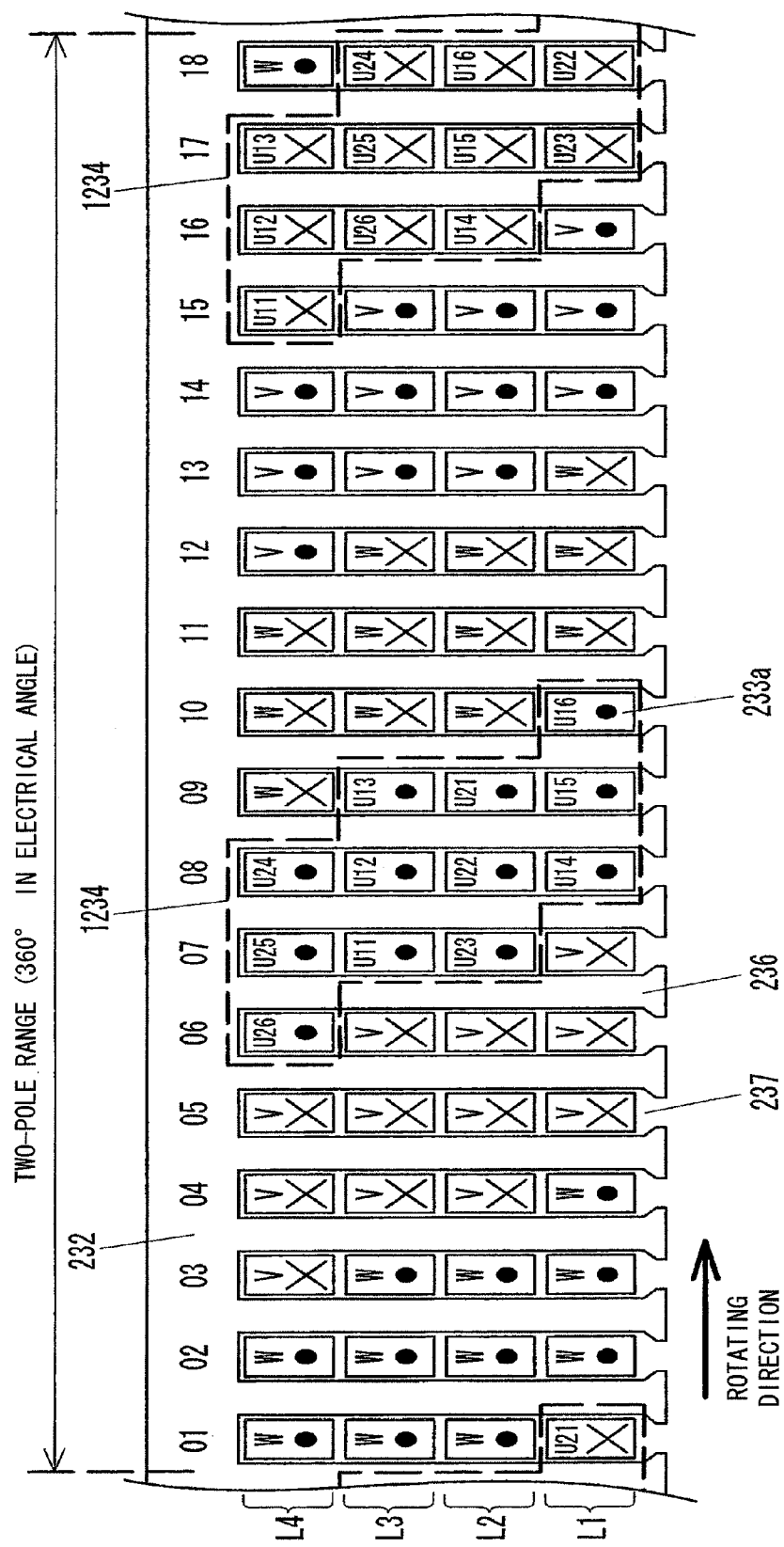

FIGS. 18 and 19 illustrate the third embodiment of the present invention achieved by adopting the present invention in a stator with the number of slots per phase per pole NSPP set to 3 and slot conductors 233a inserted in each slot 237 in four layers. FIG. 18 is a detailed connection diagram pertaining to part of the U-phase winding, with FIG. 18(a) showing the U1-phase winding group and FIG. 18(b) showing the U2-phase winding group. FIG. 19 shows the positional arrangement with which the slot conductors 233a are disposed at the stator core 232.

As shown in FIG. 18, 108 slots are formed at the stator core 232 when the number of slots per phase per pole NSPP is 3 and slot conductors 233a are inserted through in each slot 237 in four layers (2×NL). At such a stator, the U1-phase winding group and the U2-phase winding group are each made up with six round windings. In addition, the cross conductors in the round windings each run astride slots with a 5-slot pitch and a 7-slot pitch alternately.

In the U1-phase winding group shown in FIG. 18(a), the coil extending from the layer-4 position in the slot assigned with slot No. 105 through the layer-3 position in the slot assigned with slot No. 07 constitutes a round winding U11, the coil extending from the layer-4 position in the slot assigned with slot No. 106 through the layer-3 position in the slot assigned with slot No. 08 constitutes the round winding U12 and the coil extending from the layer-4 position in the slot assigned with slot No. 107 through the layer-3 position in the slot assigned with slot No. 09 constitutes a round winding U13. The coil, having left the layer-3 position in the slot assigned with slot No. 09, moves into the slot assigned with slot No. 106 as a layer-2 slot conductor via a jumper wire. The coil extending from the layer-2 position in the slot assigned with slot No. 106 through the layer-1 position in the slot assigned with slot No. 08 constitutes a round winding U14, the coil extending from the layer-2 position in the slot assigned with slot No. 107 through the layer-1 position in the slot assigned with slot No. 09 constitutes a round winding U15, and the coil extending from the layer-2 position in the slot assigned with slot No. 108 through the layer-1 position in the slot assigned with slot No. 10 constitutes a round winding U16.

In the U2-phase winding group shown in FIG. 18(b), the coil extending from the layer-1 position in the slot assigned with slot No. 19 through the layer-2 position in the slot assigned with slot No. 09 constitutes a round winding U21, the coil extending from the layer-1 position in the slot assigned with slot No. 18 through the layer-2 position in the slot assigned with slot No. 08 constitutes a round winding U22 and the coil extending from the layer-1 position in the slot assigned with slot No. 17 through the layer-2 position in the slot assigned with slot No. 07 constitutes a round winding U13. The coil, having left the layer-2 position in the slot assigned with slot No. 07 moves into the slot assigned with slot No. 18 as a layer-3 slot conductor via a jumper wire. The coil extending from the layer-3 position in the slot assigned with slot No. 18 through the layer-4 position in the slot assigned with slot No. 08 constitutes a round winding U24, the coil extending from the layer-3 position in the slot assigned with slot No. 17 through the layer-4 position in the slot assigned with slot No. 07 constitutes a round winding U25, and the coil extending from the layer-3 position in the slot assigned with slot No. 18 through the layer-4 position in the slot assigned with slot No. 06 constitutes a round winding U26.

FIG. 19 shows the positional arrangement with which the slot conductors 233a are inserted at the slots assigned with slot Nos. 01 through 18. In the embodiment, the 18-slot pitch ranging from slot No. 01 through slot No. 18 corresponds to two poles. As FIG. 18 indicates, the round windings U14 through U16 and the round windings U21 through U23 are each inserted at slots 237 alternately as a layer-1 slot conductor and as a layer-2 slot conductor, whereas the round windings U11 through U13 and the round windings U24 through U26 are each inserted at slots 237 alternately as a layer-3 slot conductor and as a layer-4 slot conductor. A slot conductor group 1234 is formed with a set of twelve slot conductors 233a inside a dotted line enclosure in FIG. 19. The twelve slot conductors 233a are all part of the 12 round windings U11 through U16 and U21 through U26 corresponding to the same phase.

As do the twelve slot conductors 233a corresponding to the U-phase, twelve slot conductors 233a corresponding to either of the other phases, i.e., the V-phase or the W-phase, together form a slot conductor group. As in the first embodiment, a slot conductor group made up with slot conductors 233b corresponding to the U-phase and each appended with the filled circle mark, a slot conductor group made up with slot conductors 233b corresponding to the W-phase and each appended with the cross mark, a slot conductor group made up with slot conductors 233b corresponding to the V-phase and each appended with the filled circle mark, a slot conductor group made up with slot conductors 233b corresponding to the U-phase and each appended with the cross mark, a slot conductor group made up with slot conductors 233b corresponding to the W-phase and each appended with the filled circle mark, and a slot conductor group made up with slot conductors 233b corresponding to the V-phase and each appended with the cross mark are formed in this order along the direction in which the rotor rotates.

As FIG. 19 clearly indicates, the slot conductor groups 1234 formed in the embodiment, too, satisfy conditions similar to those having been described in reference to the slot conductor groups 234 (see FIG. 10) in the first embodiment. Namely:

(a) the cross conductors 233b connect slot conductors 233a by each running astride slots with the slot pitch Np set to N+1 (=7) on one coil end side and each running astride slots with the slot pitch Np set to N−1 (=5) on the other coil end side with N (=6) representing the number of slots per pole;

(b) the stator winding includes slot conductor groups 234 each made up with a set of slot conductors 223b corresponding to a single phase, which are inserted through a predetermined number Ns (=5) of consecutive slots forming a continuous range along the circumference of the stator core so as to take up successive slot positions and layer positions; and (c) the predetermined number of slots Ns is set so that Ns=NSPP+NL=5 with NSPP (=3) representing the number of slots per phase per pole when the number of layers is 2×NL (NL=2).

Consequently, the extent of torque ripple can be reduced and thus noise in the rotating electrical machine is reduced, thereby ultimately achieving the object of noise reduction in the rotating electrical machine, as in the first and second embodiments. It is particularly noteworthy that the slots at the stator core in the embodiment includes slots at each of which the four layer positions are all taken by slot conductors 233a corresponding to a single phase, as shown in FIG. 19. This positional arrangement makes it possible to minimize the extent to which the torque is lowered by the twelve slot conductors 233a, which form a slot conductor group, inserted at five successive slots.

As the number of slots per phase per pole NSPP increases, the orders of high-frequency component that can be eliminated by disposing slot conductors with a 1-slot pitch offset as shown in FIG. 11 change. For instance, when NSPP=2, the 1-slot pitch is equivalent to 30° in electrical angle. 30° equals a half cycle of the sixth-order component, and thus, the fifth-order induced voltage component and the seventh-order induced voltage component, i.e., the component in orders close to the sixth-order can be diminished, as indicated in FIG. 13. As NSPP is set to an even greater value, as in this embodiment, the 1-slot pitch becomes shorter, making it possible to reduce the higher harmonic component of even higher orders.

The positional arrangements shown in FIG. 10, in FIG. 17 and in FIG. 19, referred to in the description of the embodiments, respectively represent; an example of a positional arrangement that may be adopted when NSPP=2 and the number of layers is 4, an example of a positional arrangement that may be adopted when NSPP=2 and the number of layers is 2, and an example of a positional arrangement that may be adopted when NSPP=3 and the number of layers is 4. However, the structural conditions (a), (b) and (c) below may be satisfied in alternative positional arrangements such as those shown in FIGS. 20 through 23.

(a) The cross conductors connect the slot conductors by running astride slots with the slot pitch Np set to N+1 on one coil end side and each running astride slots with the slot pitch Np set to N−1 on the other coil end side, with N representing the number of slots per pole.

(b) The stator winding includes slot conductor groups each made up with a set of slot conductors corresponding to a single phase, which are inserted through a predetermined number Ns of consecutive slots forming a continuous range along the circumference of the stator core so as to take up successive slot positions and layer positions.

(c) The predetermined number of slots Ns is set so that Ns=NSPP+NL with NSPP representing the number of slots per phase per pole when the number of layers is 2×NL.

Figure 20:
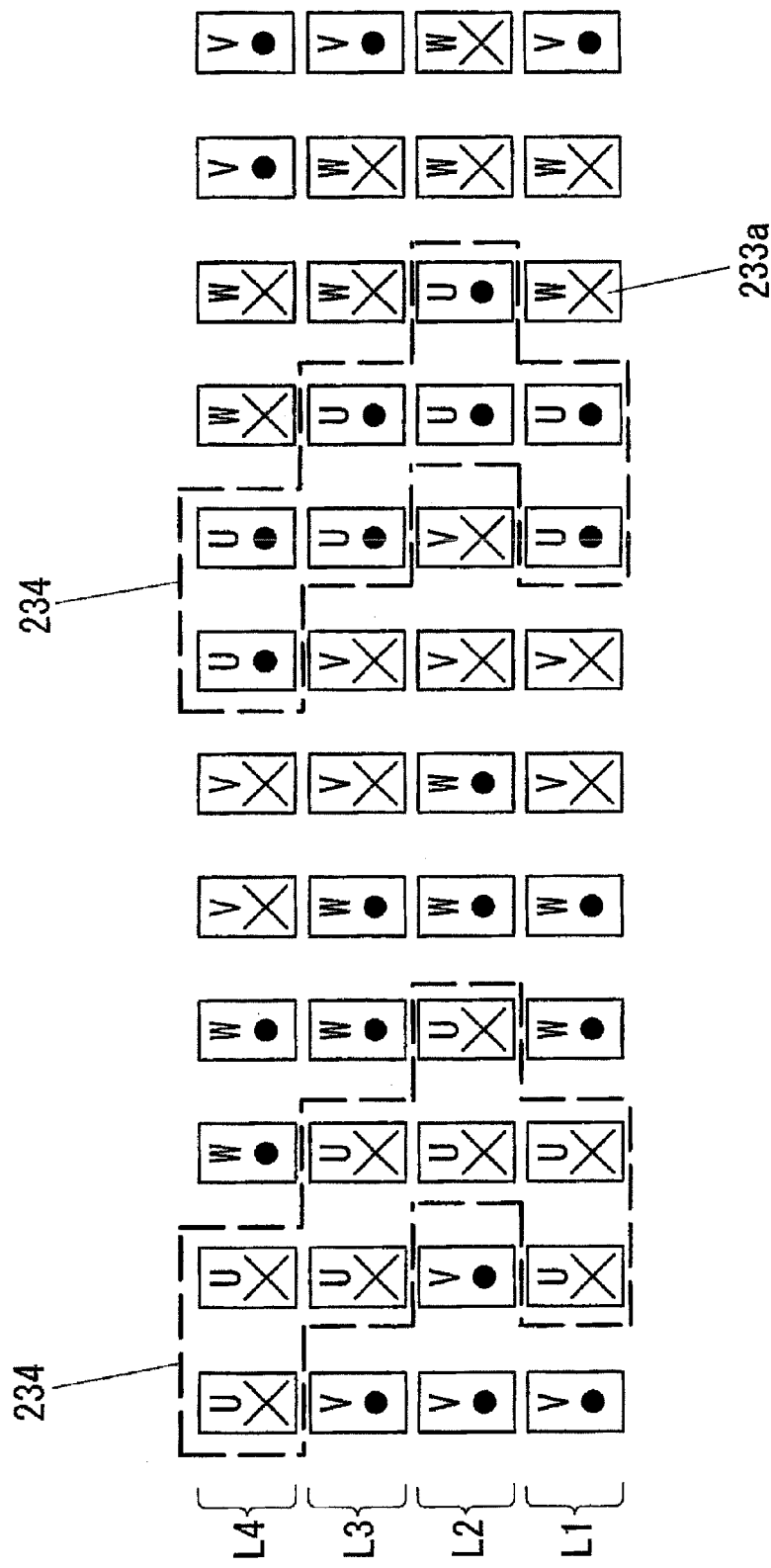

FIG. 20 presents another example of a positional arrangement that may be adopted when the number of slots per phase per pole NSPP is 2 and the number of layers (2×NL) is 4. While slot conductors 233a are disposed at the layer-3 positions and the layer-4 positions with a positional arrangement identical to that shown in FIG. 10, slot conductors 233a are disposed at the layer-1 positions and the layer-2 positions by adopting a different arrangement. In the positional arrangement shown in FIG. 10, the slot conductors 233a inserted at the layer-1 positions are offset toward the right in the figure relative to the slot conductors 233a inserted at the layer-2 positions by a 1-slot pitch, as illustrated in FIG. 11(b). In the example presented in FIG. 20, however, the slot conductors 233a inserted at the layer-2 positions are offset toward the right in the figure, relative to the slot conductors 233a inserted at the layer-1 positions, by a 1-slot pitch. In this case, too, the slot conductors 233a forming each slot conductor group are disposed over four successive slots, and the number of slot conductors 233a inserted at each slot is equal to that in the positional arrangement shown in FIG. 10. As a result, advantages similar to those of the positional arrangement shown in FIG. 10 are achieved.

The concept based upon which the positional arrangements shown in FIGS. 10 and 20 are devised from the following viewpoint. As FIGS. 7 through 10 indicate, the round windings U13, U14, U21 and U22 are inserted at slots as layer-1 slot conductors and layer-2 slot conductors. In other words, these round windings are each inserted at slots by alternately taking the layer-1 position and the layer-2 position. The positional arrangement for the slot conductors to take up the layer-1 positions and the layer-2 positions can be set independently of the positional arrangement for the slot conductors to take up the layer-3 positions and the layer-4 positions. Accordingly, a group of slot conductors to be disposed at the layer-1 positions and the layer-2 positions and a group of slot conductors to be disposed at the layer-3 positions and the layer-4 positions may each be categorized as a slot conductor subgroup and the slot conductor groups 234 shown in FIGS. 10 and 20 may each be regarded as a cluster of slot conductors made up with two slot conductor subgroups. In the following description, the slot conductor groups shown in FIG. 10 will be notated with reference numeral 234A and the slot conductor groups shown in FIG. 20 will be notated with reference numeral 234B.

Figure 21:
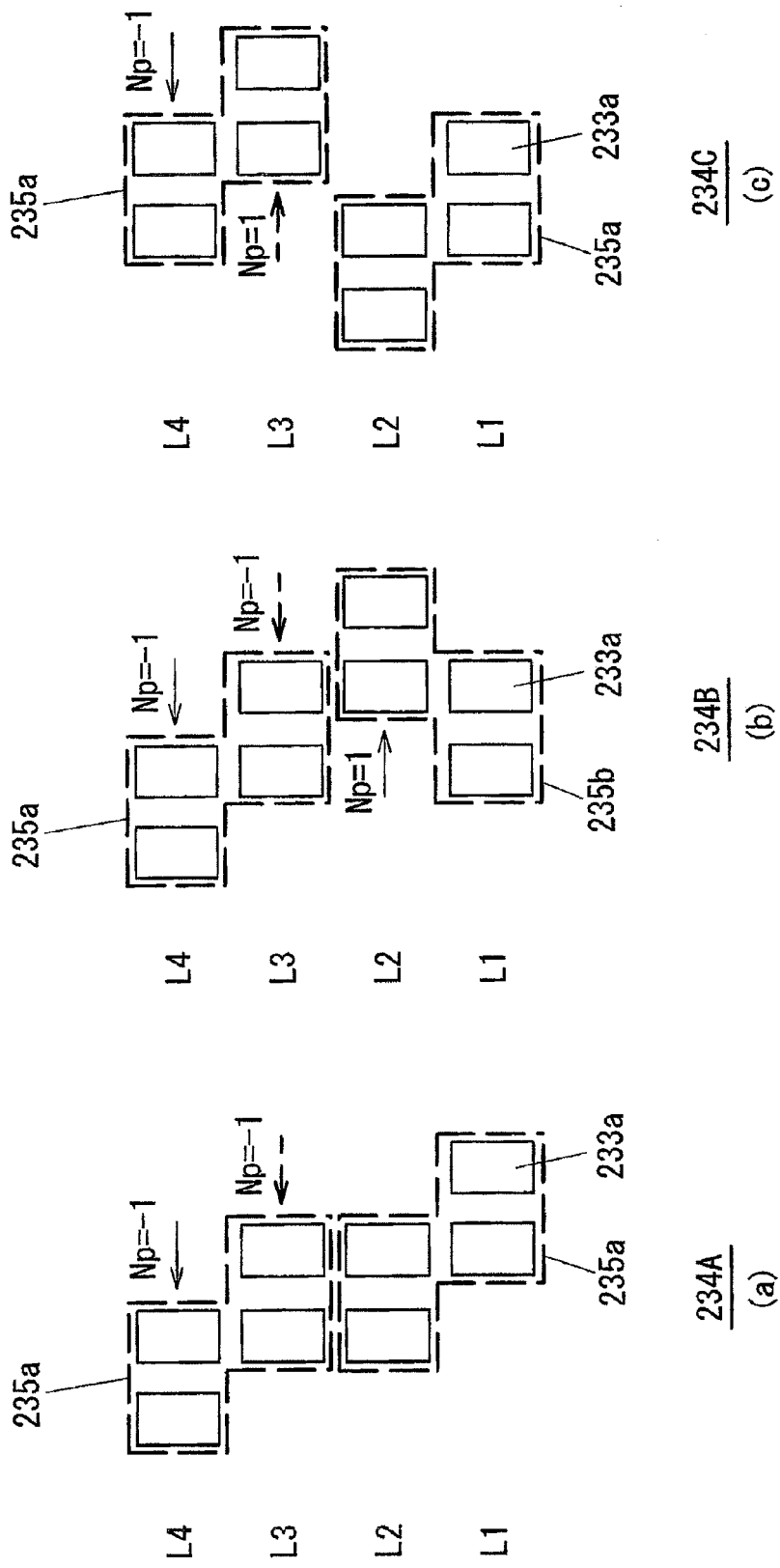

FIG. 21 presents three examples of slot conductor groups that may be formed when the number of slots per phase per pole NSPP is 2 and the number of layers (2×NL) is 4. FIG. 21(a) shows one of the slot conductor groups 234A in FIG. 10, FIG. 21(b) shows one of the slot conductor groups 234B in FIG. 20, and FIG. 21(c) shows a slot conductor group 234C.

The slot conductor group 234A shown in FIG. 21(a) is made up with two slot conductor subgroups 235a. The slot conductor subgroups 235a each include two slot conductors 233a inserted in an odd-numbered layer and two slot conductors 233a inserted in the adjacent even-numbered layer. In this description, the odd-numbered layer will be referred to as a (2m−1) layer and the even-numbered layer will be referred to as a 2m layer. It is to be noted that m=1, 2, . . . NL. When there are four layers (2×NL=4), as in FIG. 21, m takes a value of 1 or 2.

The slot conductor subgroups 235a are each formed by offsetting the slot conductors 233a in the 2m layer relative to the slot conductors 233a in the (2m−1) layer by a 1-slot pitch along the reverse rotating direction. Np in FIG. 21 indicates the slot pitch by which the slot conductors 233a are offset, with Np=1 indicating that the slot conductors are offset by a 1-slot pitch along the direction in which the rotor rotates and Np=−1, indicating that the slot conductors are offset by a 1-slot pitch along the direction opposite from the direction in which the rotor rotates. In addition, the slot conductor subgroup 235a located further toward the outer circumference is offset relative to the slot conductor subgroup 235a located on the inner circumferential side by a 1-slot pitch along the reverse rotating direction (Np=−1). It is to be noted that the solid-line arrows in FIG. 21 each indicate the direction along which the slot conductors are offset relative to the other two slot conductors within the same slot conductor subgroup, whereas the dotted-line arrows each indicate the direction along which one slot conductor subgroup is offset relative to the other slot conductor subgroup.

The slot conductor group 234B shown in FIG. 21(b), on the other hand, is formed with two different types of slot conductor subgroups 235a and 235b. The slot conductor subgroup 235b is formed by offsetting the slot conductors 233a in the 2m layer relative to the slot conductors 233a in the (2m−1) layer by a 1-slot pitch along the rotating direction (Np=1). In addition, the slot conductor subgroup 235a located further toward the outer circumference is offset relative to the slot conductor subgroup 235b located on the inner circumferential side by a 1-slot pitch along the reverse rotating direction (Np=−1). In other words, the center of the slot conductor subgroup 235a along the circumferential direction is offset relative to the position of the center of the slot conductor subgroup 235b along the circumferential direction by a 1-slot pitch along the reverse rotating direction.

While the slot conductor group 234C shown in FIG. 21(c) is similar to that shown in FIG. 21(a) in that it is made up with identical slot conductor subgroups 235a, the slot conductor subgroups 235a are disposed by adopting a positional arrangement different from that in FIG. 21(a). The slot conductor subgroup 235a located further toward the outer circumference in the slot conductor group 234C is offset relative to the slots conductor subgroup 235a located on the inner circumferential side by a 1-slot pitch along the rotor rotating direction (Np=1).

While the slot conductors 233a in the slot conductor groups 234A through 234C shown in FIG. 21 are disposed with different positional arrangements, the slot conductor groups 234A through 234C each invariably include NL slot conductor subgroups each made up with slot conductors disposed in the (2m−1) layer and slot conductors disposed in the 2m layer, which are offset relative to each other by a 1-slot pitch along the circumference of the stator core (either along the rotor rotating direction or along the reverse rotating direction). In addition, the NL slot conductor subgroups in each of the slot conductor groups 234A through 234C are disposed with an offset relative to each other by a 1-slot pitch along the circumference of the stator core. In other words, the slot conductor subgroup located toward the outer circumference is offset relative to the slot conductor subgroup located on the inner circumferential side by a 1-slot pitch along the circumference of the stator core.

Figure 22:
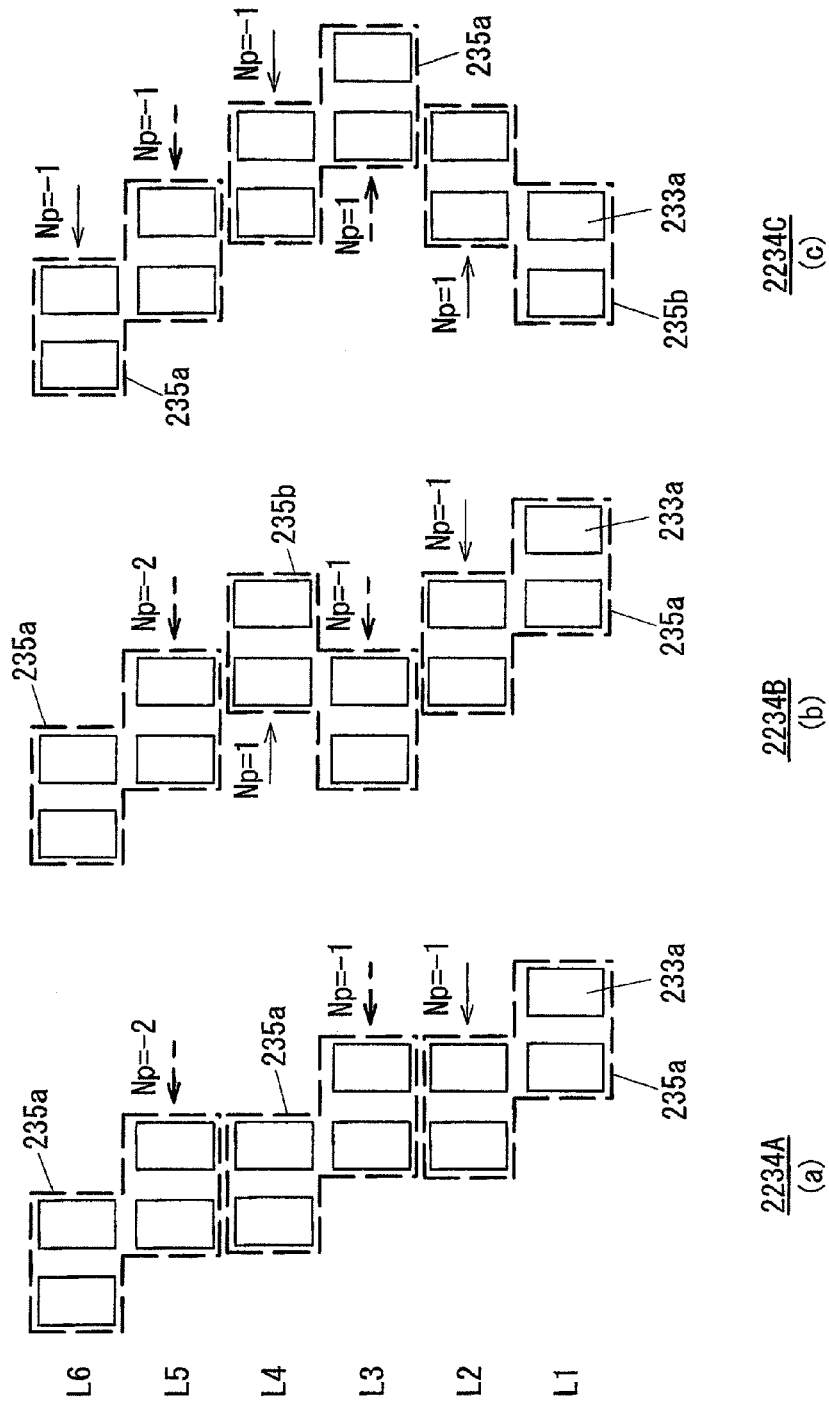

FIG. 22 presents examples of three different slot conductor groups that may be formed when the number of slots per phase per pole NSPP is set to 2 and the number of layers NL is six, with FIG. 22(a), FIG. 22(b) and FIG. 22(c) respectively showing a slot conductor group 2234A, a slot conductor group 2234B and a slot conductor group 2234C. Since there are six layers (2×NL=6), the slot conductor groups 2234A, 2234B and 2234C are all invariably made up with three slot conductor subgroups. The three slot conductor subgroups are each either a slot conductor subgroup 235a or a slot conductor subgroup 235b among the slot conductor subgroups shown in FIG. 21.

In the slot conductor group 2234A shown in FIG. 22(a), a slot conductor subgroup 235a disposed immediately outward relative to a slot conductor subgroup 235a disposed at the innermost position is offset relative to the innermost slot conductor subgroup 235a by a 1-slot pitch along the reverse rotating direction (Np=−1). The slot conductor subgroup 235a disposed further outside is offset relative to the innermost slot conductor subgroup 235a by a 2-slot pitch (Np=−2). In other words, the outermost slot conductor subgroup 235a is offset relative to the slot conductor subgroup 235a located immediately inward and adjacent to the outermost slot conductor subgroup 235a by a 1-slot pitch.

The slot conductor group 2234B shown in FIG. 22(b) is made up with two slot conductor subgroups 235a and one slot conductor subgroup 235b. The slot conductor subgroup 235b disposed outward immediately next to the innermost slot conductor subgroup 235a is offset relative to the innermost slot conductor subgroup 235a by a 1-slot pitch along the reverse rotating direction (Np=−1) and the slot conductor subgroup 235a disposed further outside is offset relative to the innermost slot conductor subgroup 235a by a 2-slot pitch (Np=−2).

The slot conductor group 2234C shown in FIG. 22(c) is made up with two slot conductor subgroups 235a and one slot conductor subgroup 235b. The slot conductor subgroup 235a disposed outward immediately next to the innermost slot conductor subgroup 235b is offset relative to the innermost slot conductor subgroup 235b by a 1-slot pitch along the rotating direction (Np=1) and the slot conductor subgroup 235a disposed further outside is offset relative to the innermost slot conductor subgroup 235b by a 1-slot pitch along the reverse rotating direction (Np=−1).

The slot conductor groups 2234A, 2234B and 2234C having been described in reference to FIG. 22 as examples of positional arrangements that may be adopted when the number of slots per phase per pole NSPP is 2 and the number of layers NL is six, too, each invariably include NL slot conductor subgroups each made up with slot conductors disposed in the (2m−1) layer and slot conductors disposed in the 2m layer, which are offset relative to each other by a 1-slot pitch along the circumference of the stator core (either along the rotor rotating direction or along the reverse rotating direction). In addition, the NL slot conductor subgroups in each slot conductor group are disposed with an offset relative to each other by a 1-slot pitch along the circumference of the stator core.

Figure 23:
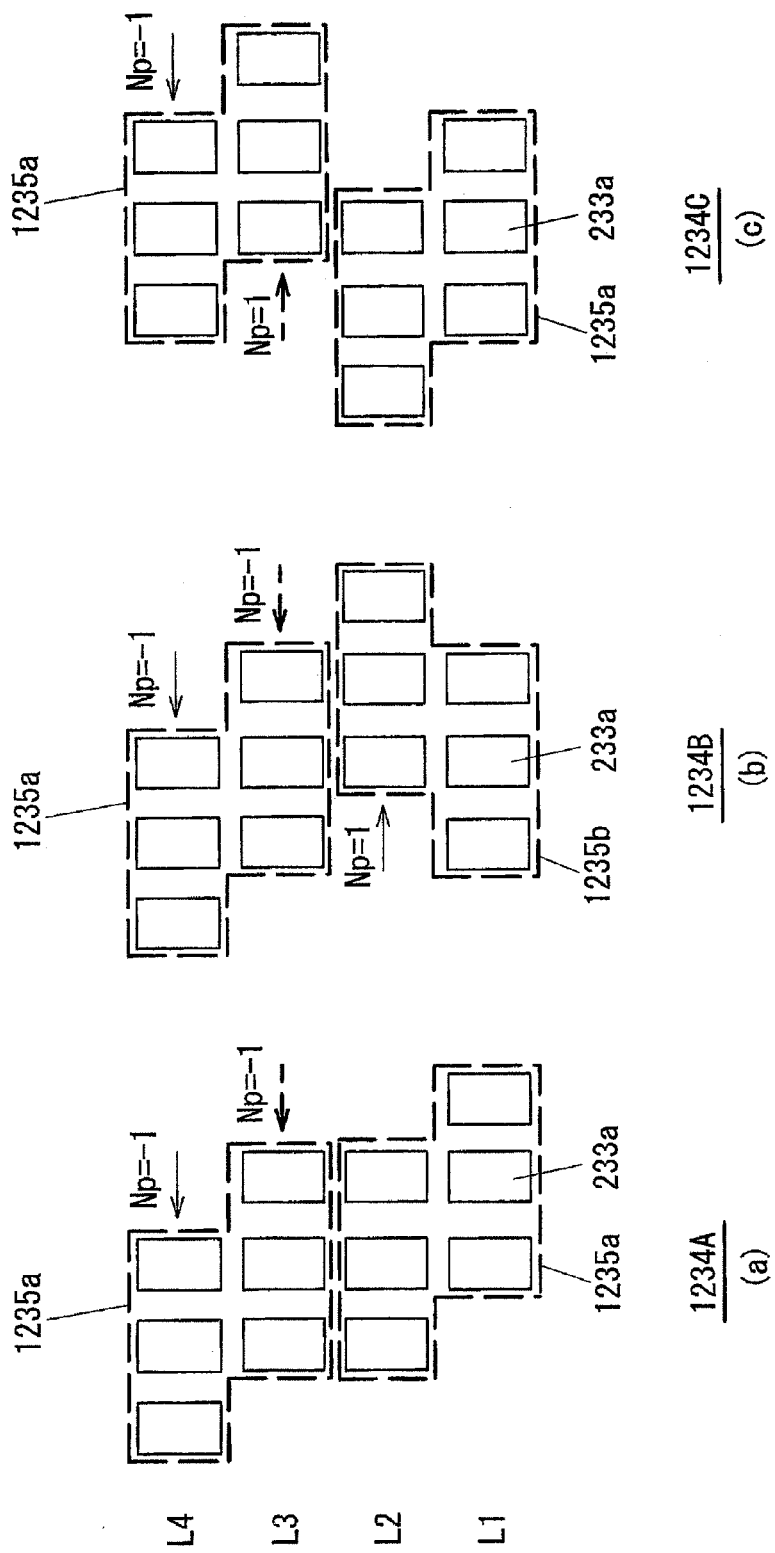

FIG. 23 presents examples of slot conductor groups that may be formed when the number of slots per phase per pole NSPP is 3 and the number of layers (2×NL) is 4 (NL=2). FIG. 22(a) shows one of the slot conductor groups 1234 in FIG. 19. In FIG. 21(a), the slot conductor group is notated as a slot conductor group 1234A. FIGS. 23(b) and 23(c) present other examples respectively notated as a slot conductor group 1234B and a slot conductor group 1234C. Since the number of slots per phase per pole NSPP is 3, the slot conductor group 1234A, the slot conductor group 1234B and the slot conductor group 1234C each invariably include three slot conductors 233a disposed in each layer within the slot conductor group and the slot conductor groups 1234A, 1234B and 1234C are all made up with two slot conductor subgroups in correspondence to the four layers (2×NL).

There are two different types of slot conductor subgroups, i.e., slot conductor subgroups 1235a and 1235b. The slot conductors 233a in the 2m layer in a slot conductor subgroup 1235a are offset relative to the slot conductors 233a in the (2m−1) layer by a 1-slot pitch along the reverse rotating direction (NL=−1). The slot conductors 233a in the 2m layer in a slot conductor subgroup 1235b are offset relative to the slot conductors 233a in the (2m−1) layer by a 1-slot pitch along the rotating direction (Np=1).

The positional arrangements with which the slot conductor subgroups are set as shown in FIG. 23(a) through 23(c) respectively correspond to the positional arrangements shown in FIGS. 21(a) through 21(c). Namely, the slot conductor subgroup 1235a located on the outer circumferential side is offset relative to the slot conductor subgroup 1235a located on the inner circumferential side by a 1-slot pitch along the reverse rotating direction (Np=−1) in the positional arrangement shown in FIG. 23(a), the slot conductor subgroup 1235a located on the outer circumferential side is offset relative to the slot conductor subgroup 1235b located on the inner circumferential side by a 1-slot pitch along the reverse rotating direction (Np=−1) in the positional arrangement shown in FIG. 23(b) and the slot conductor subgroup 1235a located on the outer circumferential side is offset relative to the slot conductor subgroup 1235a located on the inner circumferential side by a 1-slot pitch along the rotor rotating direction (Np=1) in the positional arrangement shown in FIG. 23(c).

The various slot conductor groups having been described in reference to FIG. 23 as examples of positional arrangements that may be adopted when the number of slots per phase per pole NSPP is 3 and the number of layers (2×NL) is 4, too, each invariably include NL slot conductor subgroups each made up with slot conductors disposed in the (2m−1) layer and slot conductors disposed in the 2m layer, which are offset relative to each other by a 1-slot pitch along the circumference of the stator core (either along the rotor rotating direction or along the reverse rotating direction). In addition, the NL slot conductor subgroups are disposed with an offset relative to each other by a 1-slot pitch along the circumference of the stator core.

In addition, the following alternative description applies to the structures adopted for the slot conductor groups shown in FIG. 21(a), FIG. 22(a) and FIG. 23(a). Namely, the stator winding includes slot conductor groups each made up with a group of slot conductors 233a corresponding to a single phase, which are disposed in successive slots with slot conductors inserted at a given slot taking successive layer positions. Slot conductors taking up matching layer positions are disposed over successive slots, the number of which is represented by NSPP. In each slot conductor group, the slot conductors in the 2mth layer (i.e., in an even-numbered layer), counting from the inner circumferential side of the slots, are disposed with an offset relative to the slot conductors in the first layer by an m-slot pitch along the reverse rotating direction, i.e., a direction running along the circumference of the stator core and the slot conductors in the (2m−1)th layer (i.e., an odd-numbered layer) except for the first layer, are disposed with an offset relative to the slot conductors in the first layer by an (m−1)-slot pitch along the reverse rotating direction. NSPP represents the number of slots per phase per pole, the number of layers is expressed as 2×NL and m=1, 2, . . . , NL.

As described above, a reduction in the extent of torque ripple and a reduction in noise are achieved through the embodiments adopting special winding arrangements in stator windings with wave winding patterns so as to reduce the higher harmonic component in the interlinking magnetic flux. While it is known in the related art that torque ripple can be decreased by skewing the rotor, the specific component that can be reduced is determined in correspondence to the skew angle. This means that the sixth-order torque ripple component and the twelfth-order torque ripple component, for instance, cannot be reduced at the same time simply by skewing the rotor. In the embodiment shown in FIG. 10, the sixth-order torque ripple component can be greatly reduced although the twelfth-order torque ripple component cannot be reduced, as indicated in FIG. 15. Accordingly, the embodiment may be adopted in conjunction with a rotor skewed so as to reduce the twelfth-order torque ripple component in order to further reduce torque ripple and, ultimately, to provide a rotating electrical machine assuring minimized noise.

In addition, the present invention may be adopted to achieve lower noise in a vehicle that utilizes the rotating electrical machine described above, a battery that provides DC power and a conversion device that converts the DC power from the battery to AC power and provides the AC power to the rotating electrical machine, characterized in that torque generated in the rotating electrical machine is used as drive force, such as the vehicle described in reference to FIGS. 1 and 2.

While the invention has been described in reference to an example in which it is adopted in a magnet motor used in vehicular applications, the higher harmonic component included in the waveform of the magnetomotive force at the stator 230 can also be reduced by adopting the present invention. Accordingly, the present invention may be adopted in various types of motors with no magnets disposed at the rotor 250, such as induction motors and synchronous reluctance motors. Furthermore, the present invention may be adopted in motors used in various applications other than vehicular applications. Moreover, the present invention may be adopted in various other types of rotating electrical machines, such as generators, instead of motors. As long as the features characterizing the present invention are not compromised, the present invention is by no means limited in any way whatsoever to the particulars of the embodiments described above.

The disclosure of the following priority application is herein incorporated by reference:
Japanese Patent Application No. 2010-163100 filed Jul. 20, 2010.

The invention claimed is:
1. A rotating electrical machine, comprising:
a stator core having a plurality of slots formed therein;
a stator winding assuming a plurality of phases, which includes a plurality of round windings wound with a wave winding pattern, each having slot conductors each inserted at one of the slots at the stator core to form one of a plurality of layers and cross conductors each connecting same-side ends of slot conductors inserted at different slots so as to form a coil end; and
a rotor rotatably supported with an air gap so as to be allowed to rotate relative to the stator core, wherein:
the cross conductors connect the slot conductors so as to run astride slots with the slot pitch Np set to N+1 at coil ends on one side and run astride slots with the slot pitch Np set to N−1 at coil ends on another side, with N representing a number of slots per pole;

the stator winding includes a plurality of stator winding groups, wherein no phase difference manifests between voltages induced at each of the stator winding groups of the same phase, wherein each of the stator winding groups includes a plurality of the round windings of the same phase, and the stator winding includes a plurality of slot conductor groups each having a plurality of slot conductors corresponding to a single phase;

the plurality of slot conductors in each slot conductor group are inserted at a predetermined number Ns of successive slots forming a continuous range along a circumference of the stator core so that the slot conductors in the slot conductor group take successive slot positions and successive layer positions; and the predetermined number Ns is set so that Ns=NSPP+NL when NSPP represents a number of slots per phase per pole and NL represents a number that is equal to a number of layers divided by 2.

2. A rotating electrical machine according to claim 1, wherein:

the slot conductor groups each include NL slot conductor subgroups each formed by disposing slot conductors in a (2m−1)th layer and slot conductors in a 2mth layer with an offset relative to each other along the circumference of the stator core by a 1-slot pitch;

the NL slot conductor subgroups are disposed with a 1-slot pitch offset relative to one another along the circumference of the stator core; and m=1, 2, . . . , NL.

3. The rotating electrical machine according to claim 1, wherein:

the stator winding includes a plurality of slot conductor groups each having a plurality of slot conductors corresponding to a single phase, formed by disposing slot conductors to form a specific layer over a predetermined number NSPP of successive slots;

in each slot conductor group, slot conductors in a 2mth layer, counting from an inner circumferential side of the slots, are disposed with an offset relative to slot conductors in a first layer by an m-slot pitch in one direction running along a circumference of the stator core and slot conductors in a (2m−1)th layer, excluding the first layer, are disposed with an offset relative to the slot conductors in the first layer by an (m−1) slot pitch in the one direction; and m=1, 2, . . . , NL.

4. A rotating electrical machine according to claim 1, wherein:

the round windings are each formed by connecting a plurality of segment conductors.

5. A rotating electrical machine according to claim 1, wherein:

the slot conductors are constituted with flat wire.

6. A rotating electrical machine according to claim 1, wherein:

the stator winding includes a plurality of Y connections and there is no phase difference manifesting between voltages induced at same-phase windings in the plurality of Y connections.

7. A vehicle, comprising:

a rotating electrical machine according to claim 1;

a battery that provides DC power; and a conversion device that converts the DC power originating from the battery to AC power and provides the AC power to the rotating electrical machine, wherein:

torque generated in the rotating electrical machine is used as a drive force to drive the vehicle.

* * * * *